US010593043B2

(12) United States Patent
Lin et al.

(10) Patent No.: US 10,593,043 B2
(45) Date of Patent: Mar. 17, 2020

(54) UTILIZING DEEP LEARNING FOR BOUNDARY-AWARE IMAGE SEGMENTATION

(71) Applicant: Adobe Inc., San Jose, CA (US)

(72) Inventors: Zhe Lin, Fremont, CA (US); Yibing Song, Hong Kong (CN); Xin Lu, Mountain View, CA (US); Xiaohui Shen, San Jose, CA (US); Jimei Yang, Merced, CA (US)

(73) Assignee: ADOBE INC., San Jose, CA (US)

( * ) Notice: Subject to any disclaimer, the term of this patent is extended or adjusted under 35 U.S.C. 154(b) by 148 days.

(21) Appl. No.: 15/950,087

(22) Filed: Apr. 10, 2018

(65) Prior Publication Data

US 2018/0232887 A1 Aug. 16, 2018

Related U.S. Application Data

(63) Continuation of application No. 15/086,590, filed on Mar. 31, 2016, now Pat. No. 9,972,092.

(51) Int. Cl.
*G06T 7/13* (2017.01)
*G06K 9/66* (2006.01)
(Continued)

(52) U.S. Cl.
CPC ............ *G06T 7/13* (2017.01); *G06K 9/00369* (2013.01); *G06K 9/38* (2013.01); *G06K 9/4628* (2013.01);
(Continued)

(58) Field of Classification Search
CPC ..... G06T 7/13; G06T 7/12; G06T 7/11; G06T 2207/20076; G06T 2207/20081;
(Continued)

(56) References Cited

U.S. PATENT DOCUMENTS 6,404,936 B1 * 6/2002 Katayama ................. G06T 7/11
345/626
8,358,691 B1 1/2013 Wang et al.
(Continued)

FOREIGN PATENT DOCUMENTS

JP 2015065610 A 4/2015

OTHER PUBLICATIONS

L.-C. Chen, G. Papandreou, I. Kokkinos, K. Murphy, and A. L. Yuille. Sematic image segmentation with deep convolutional nets and fully connected crfs. In IEEE International Conference on Learning Representations, 2015.
(Continued)

*Primary Examiner* — Jerome Grant, II
(74) *Attorney, Agent, or Firm* — Keller Jolley Preece

(57) ABSTRACT

Systems and methods are disclosed for segmenting a digital image to identify an object portrayed in the digital image from background pixels in the digital image. In particular, in one or more embodiments, the disclosed systems and methods use a first neural network and a second neural network to generate image information used to generate a segmentation mask that corresponds to the object portrayed in the digital image. Specifically, in one or more embodiments, the disclosed systems and methods optimize a fit between a mask boundary of the segmentation mask to edges of the object portrayed in the digital image to accurately segment the object within the digital image.

20 Claims, 14 Drawing Sheets

(51) Int. Cl.
*G06K 9/38* (2006.01)
*G06K 9/00* (2006.01)
*G06K 9/46* (2006.01)
*G06T 7/12* (2017.01)
*G06N 3/04* (2006.01)
*G06N 7/00* (2006.01)
*G06N 3/08* (2006.01)
*G06T 7/11* (2017.01)

(52) U.S. Cl.
CPC ............. *G06K 9/66* (2013.01); *G06N 3/0454* (2013.01); *G06N 3/08* (2013.01); *G06N 7/005* (2013.01); *G06T 7/11* (2017.01); *G06T 7/12* (2017.01); *G06T 2207/20076* (2013.01); *G06T 2207/20081* (2013.01)

(58) Field of Classification Search
CPC ........ G06N 3/08; G06N 7/005; G06N 3/0454; G06K 9/4628; G06K 9/00369; G06K 9/38; G06K 9/66
USPC .......................................................... 382/157
See application file for complete search history.

(56) References Cited

U.S. PATENT DOCUMENTS

| | | | |
|---|---|---|---|
| 9,031,339 B2 | 5/2015 | Shimizu et al. | |
| 9,659,364 B2 | 5/2017 | Pekar et al. | |
| 10,282,431 B1* | 5/2019 | Bhotika | G06F 16/5838 |
| 2004/0189676 A1 | 9/2004 | Dischert | |
| 2006/0045336 A1* | 3/2006 | Lim | G06T 7/12 |
| | | | 382/173 |
| 2008/0168120 A1 | 7/2008 | Suzuyama et al. | |
| 2013/0332523 A1* | 12/2013 | Luuu | G06O 30/0251 |
| | | | 709/204 |
| 2014/0272889 A1 | 9/2014 | Kulkarni et al. | |
| 2014/0289856 A1 | 9/2014 | Jiang et al. | |
| 2015/0063709 A1 | 3/2015 | Wang et al. | |
| 2015/0169956 A1 | 6/2015 | You et al. | |
| 2015/0201175 A1* | 7/2015 | Sartor | G06T 5/005 |
| | | | 382/107 |
| 2015/0302594 A1 | 10/2015 | Moore et al. | |
| 2016/0267690 A1 | 9/2016 | Bai et al. | |
| 2016/0301908 A1* | 10/2016 | Itakura | G06T 5/40 |
| 2017/0090432 A1 | 3/2017 | Funakubo | |
| 2017/0280318 A1 | 9/2017 | Steidley | |
| 2017/0287137 A1 | 10/2017 | Lin et al. | |
| 2018/0033173 A1* | 2/2018 | Choi | G06T 11/60 |
| 2018/0060701 A1* | 3/2018 | Krishnamurthy | G06K 9/6269 |
| 2018/0232887 A1* | 8/2018 | Lin | G06K 9/66 |
| 2018/0284760 A1* | 10/2018 | Gupta | G05D 1/0016 |
| 2019/0130191 A1* | 5/2019 | Zhou | G06K 9/00744 |
| 2019/0180434 A1* | 6/2019 | Sheth | G06T 7/0002 |
| 2019/0205606 A1* | 7/2019 | Zhou | G06K 9/0014 |
| 2019/0208088 A1* | 7/2019 | Nakajima | H04N 1/00482 |
| 2019/0236394 A1* | 8/2019 | Price | G06T 7/11 |
| 2019/0236955 A1* | 8/2019 | Hu | G08G 1/09675 |
| 2019/0258878 A1* | 8/2019 | Koivisto | G06K 9/00805 |
| 2019/0266726 A1* | 8/2019 | Madabhushi | G06T 5/002 |
| 2019/0279371 A1* | 9/2019 | Usikov | G06K 9/00664 |
| 2019/0287247 A1* | 9/2019 | Duchesne | G06T 7/174 |
| 2019/0303699 A1* | 10/2019 | Dwivedi | G06K 9/6212 |

OTHER PUBLICATIONS

M. Everingham, L. Van Gool, C. Williams, J. Winn, and A. Zisserman. The pascal visual object classes (voc) challenge. International Journal of Computer Vision, 2010.
R. Girshick. Fast r-cnn. In IEEE International Conference on Computer Vision, 2015.
P. Krahenbuhl and V. Koltun. Efficient inference in fully connected crfs with gaussian edge potentials. In Advances in Neural Information Processing Systems, 2011.
A. Krizhevsky, I. Sutskever, and G. E. Hinton. Imagenet classification with deep convolutional neural networks. In Advances in Neural Information Processing Systems, 2012.
T.-Y. Lin, M. Maire, S. Belongie, J. Hays, P. Perona, D. Ramanan, P. Dollr, and C. L. Zitnick. Microsoft coco: common objects in context. In European Conference on Computer Vision, 2014.
Z. Liu, X. Li, P. Luo, C. C. Loy, and X. Tang. Semantic image segmentation via deep parsing network. In IEEE International Conference on Computer Vision, 2015.
J. Long, E. Shelmaer, and D. Trevor. Fully convolutional networks for sematic segmentation. In IEEE Conference on Computer Vision and Pattern Recognition, 2015.
H. Noh, S. Hong, and B. Han. Learning deconvolution network for semantic segmentation. In IEEE International Conference on Computer Vision, 2015.
C. Rother, V. Kolmogorov, and A. Blake. Grabcut-interactive foreground extraction using iterated graph cuts. ACM Transactions on Graphics (SIGGRAPH), 2004.
K. Simonyan and A. Zisserman. Very deep convolutional networks for large-scale image recognition. arXiv technical report, 2014.
U.S. Appl. 15/086,590, Jun. 26, 2017, Office Action.
U.S. Appl. No. 15/086,590, Jan. 10, 2018, Notice of Allowance.

* cited by examiner

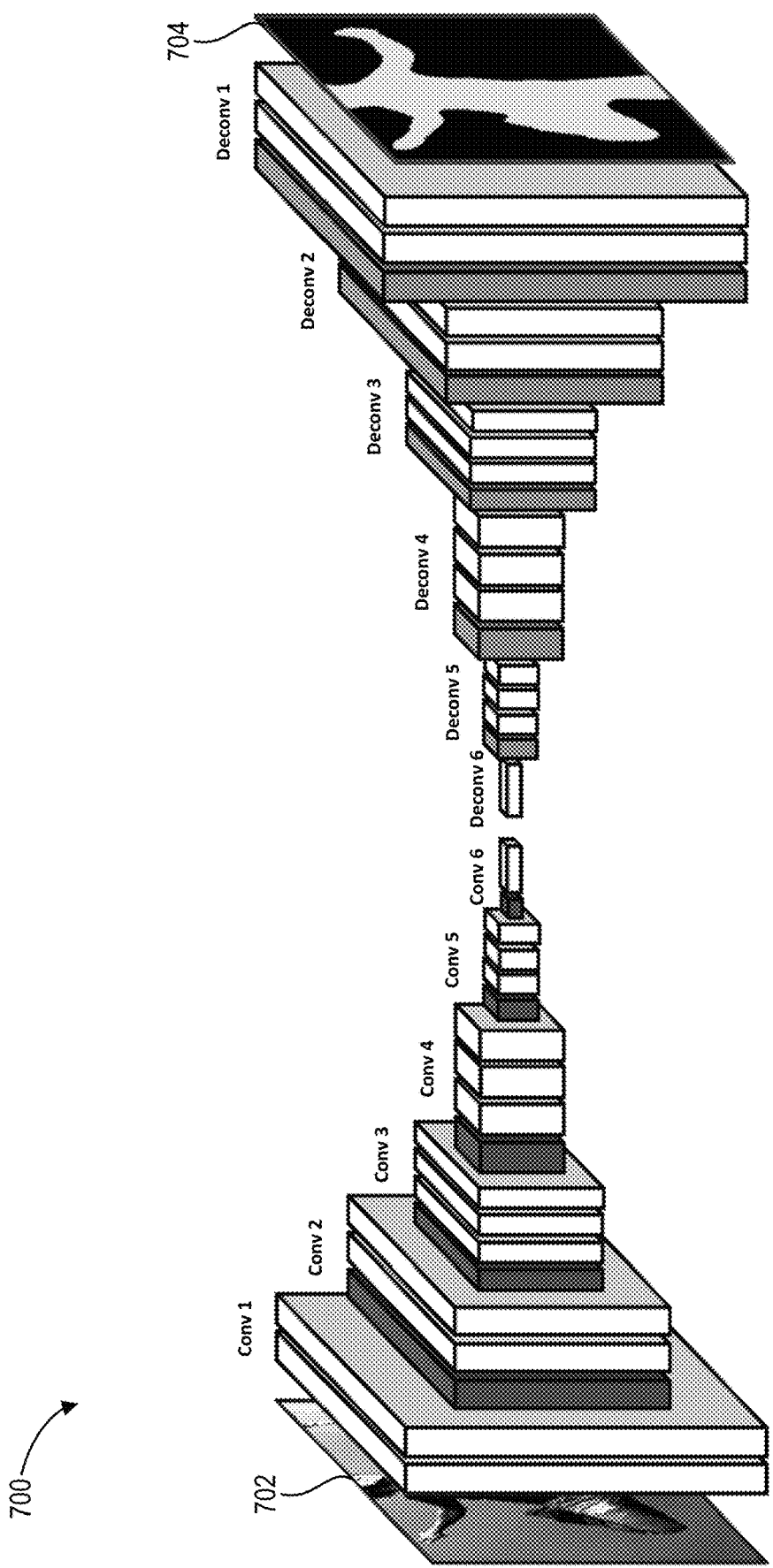

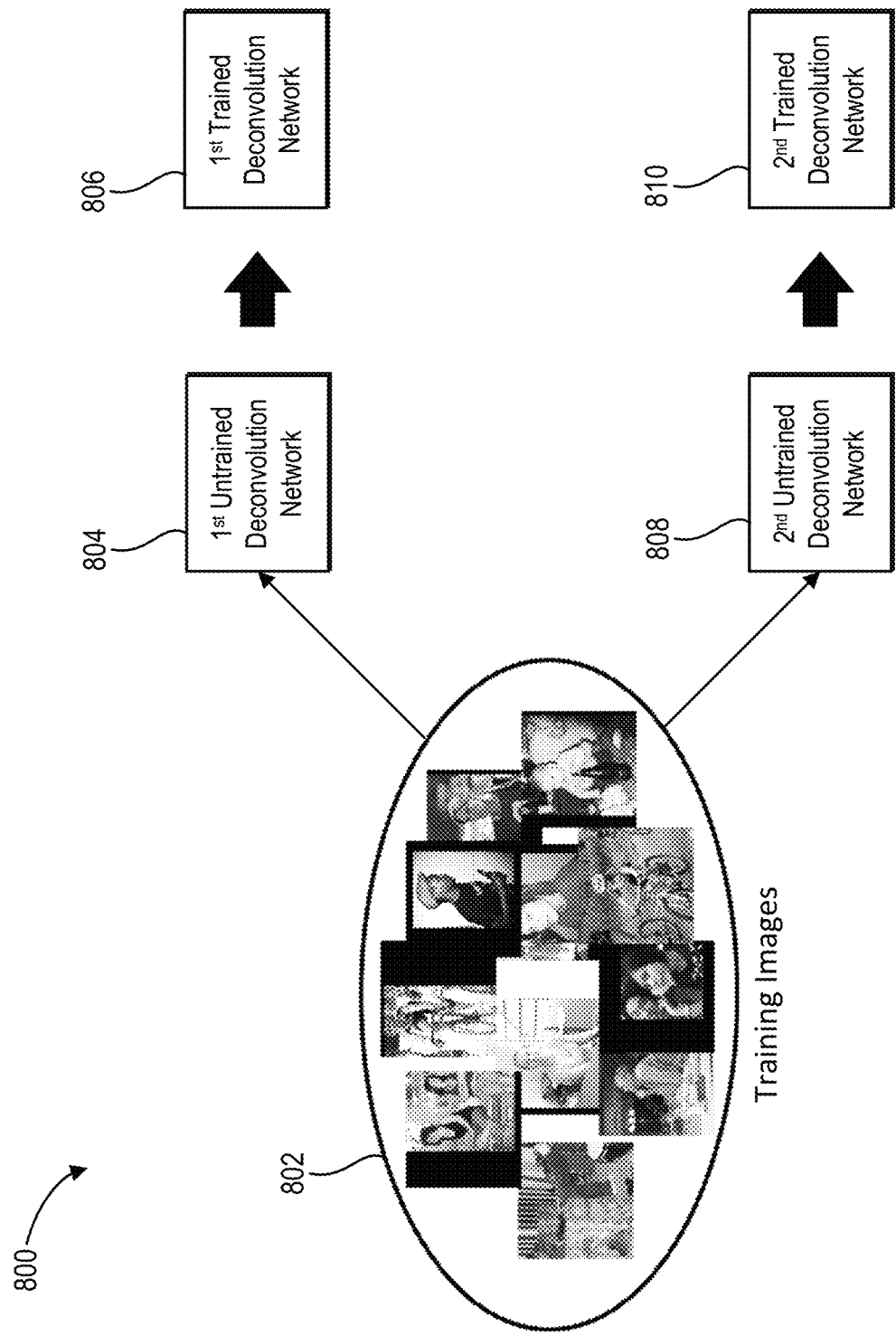

UTILIZING DEEP LEARNING FOR BOUNDARY-AWARE IMAGE SEGMENTATION

CROSS REFERENCE TO RELATED APPLICATIONS

The present application is a continuation of U.S. application Ser. No. 15/086,590, filed Mar. 31, 2016. The aforementioned application is hereby incorporated by reference in its entirety.

BACKGROUND

1. Technical Field

The present disclosure relates generally to identifying objects in digital visual media. More specifically, one or more embodiments of the present disclosure relate to systems and methods that utilize deep learning techniques to automatically identify objects in digital images.

2. Background and Relevant Art

Recent years have seen a rapid proliferation in the use digital media, such as digital photography. Digital photography has several advantages that draw individuals and businesses to increasingly utilize digital photography. One significant advantage of digital photography is the ability for a user to edit or otherwise customize a digital image for a particular purpose. Although there are numerous tools used to edit a digital image, one tool that users often use is a segmentation tool that is able to identify and select a specific portion of a digital image during the editing process. For example, users routinely desire to select, segregate, and/or modify a digital representation of an object (e.g., a person) in a digital image separately from a background in the digital image (e.g., to replace the background or otherwise modify the individual portrayed in the digital image). Accordingly, there is an increasing demand for systems that can distinguish between pixels that correspond to an object in a digital image from pixels that correspond to a background of the digital image.

Some conventional digital image editing systems assist users in segmenting an image to distinguish an object portrayed in a digital image from the background of the digital image, however, these conventional systems have a number of disadvantages. For example, conventional systems do not calculate or generate a cohesive boundary between the pixels that correspond to an object portrayed in the digital image and the pixels that correspond to a background. In particular, many conventional systems use a segmentation process that ignores, or often degrades, the quality of boundaries between the object portrayed in the digital image and the background. Accordingly, conventional systems frequently produce results that are unsatisfying and require significant manual labor to correct.

Specifically, conventional systems often produce false positive pixel identification where pixels that correspond to the background are incorrectly identified as pixels that correspond to the object. The false positive pixel identification produces results where several portions of the background are incorrectly selected, which ultimately provides a flawed segmentation.

In addition, conventional systems produce false negative pixel identification where pixels that correspond to the object are incorrectly identified as background pixels. In the case of false negative pixel identifications, the resulting selection of pixels produces an incomplete capturing of the object portrayed in the image. For example, a portion, or in many cases several portions, of the object portrayed in the digital image appear to be cutoff in the results of the segmentation process. Therefore, based on the false negative pixel identification, conventional systems often produce an incomplete segmentation of the image.

Moreover, many conventional systems produce false negative pixel identification based on conventional object detectors used in conventional systems. In general, object detectors in conventional systems attempt to detect an object within a digital image, and then crop out a portion of the digital image that includes the object to obtain a smaller portion of the image in the hopes of simplifying a segmentation process. Conventional object detectors, however, often cause more harm than good when used as part of a conventional segmentation processes. In particular, conventional object detectors often fail to detect the entirety of an object, and as such, conventional object detectors often crop out one or more portions of an object prior to segmentation. As such, conventional systems often produce a segmentation that completely fails to properly identify large portions of an object.

Unfortunately, the process for a user to manually fix an incorrectly segmented image resulting from a conventional system is often time intensive and technically difficult because of the irregular shapes that can exist in an incorrectly segmented image. In fact, although the process to manually select an object portrayed in a digital image is difficult and time intensive, manually segmenting an image is often faster and easier for a user compared to having to fix or adjust an incorrectly segmented image produced using conventional systems. Thus, many users become frustrated in the segmentation capabilities of conventional systems and choose to continue to simply use a manual segmentation process.

These and other problems exist with regard to identifying objects in digital visual media.

BRIEF SUMMARY

Introduced here are techniques/technologies that identify objects within digital images utilizing deep learning techniques. In particular, in one or more embodiments, systems and methods utilize deep learning techniques to segment images to select or delineate objects portrayed within digital images. For example, in one or more embodiments, the system and methods identify an object portrayed in a digital image utilizing deep learning techniques in combination with an optimization process to generate a segmentation mask that accurately identifies pixels corresponding to the object. In particular, the systems and methods utilize deep learning neural networks in combination with an optimization process to accurately fit a segmentation mask to the edges an object portrayed in a digital image.

More specifically, in one or more embodiments, the systems and methods use a combination of two neural networks to generate object identification information for a digital image. For example, the systems and methods train a first neural network to predict pixels within a digital image that correspond to an object portrayed in a digital image. In addition, the systems and methods train a second neural network to predict pixels within the digital image that correspond to edges of the object portrayed in the digital image. Using the pixels identified using the two differently trained neural networks, the systems and methods optimize a segmentation mask to accurately identify pixels within the digital image that correspond with the object.

For instance, in order to optimize a segmentation mask, the systems and methods iteratively adjust a mask boundary of the segmentation mask to better align or otherwise fit with edges of the object portrayed in the digital image. Using the pixel identification information obtained from the two neural networks as a guide, the systems and methods iteratively optimize mask boundary of the segmentation mask by focusing on areas of the digital image that are proximate the edges of the object. Accordingly, the systems and methods gradually adjust a mask boundary of the segmentation mask to align with edges of the object portrayed in the digital image. Accordingly, the systems and methods provide an easy and accurate way for a user to segment an image to select or otherwise identify an object within a digital image.

Additional features and advantages of exemplary embodiments of the present disclosure will be set forth in the description which follows, and in part will be obvious from the description, or may be learned by the practice of such exemplary embodiments.

BRIEF DESCRIPTION OF THE DRAWINGS

The detailed description is described with reference to the accompanying drawings in which:

FIG. 7 illustrates an example of a deep learning neural network in accordance with one or more embodiments;

FIG. 8 illustrates a diagram of a process of training deep learning neural networks in accordance with one or more embodiments;

DETAILED DESCRIPTION

Figure 1:
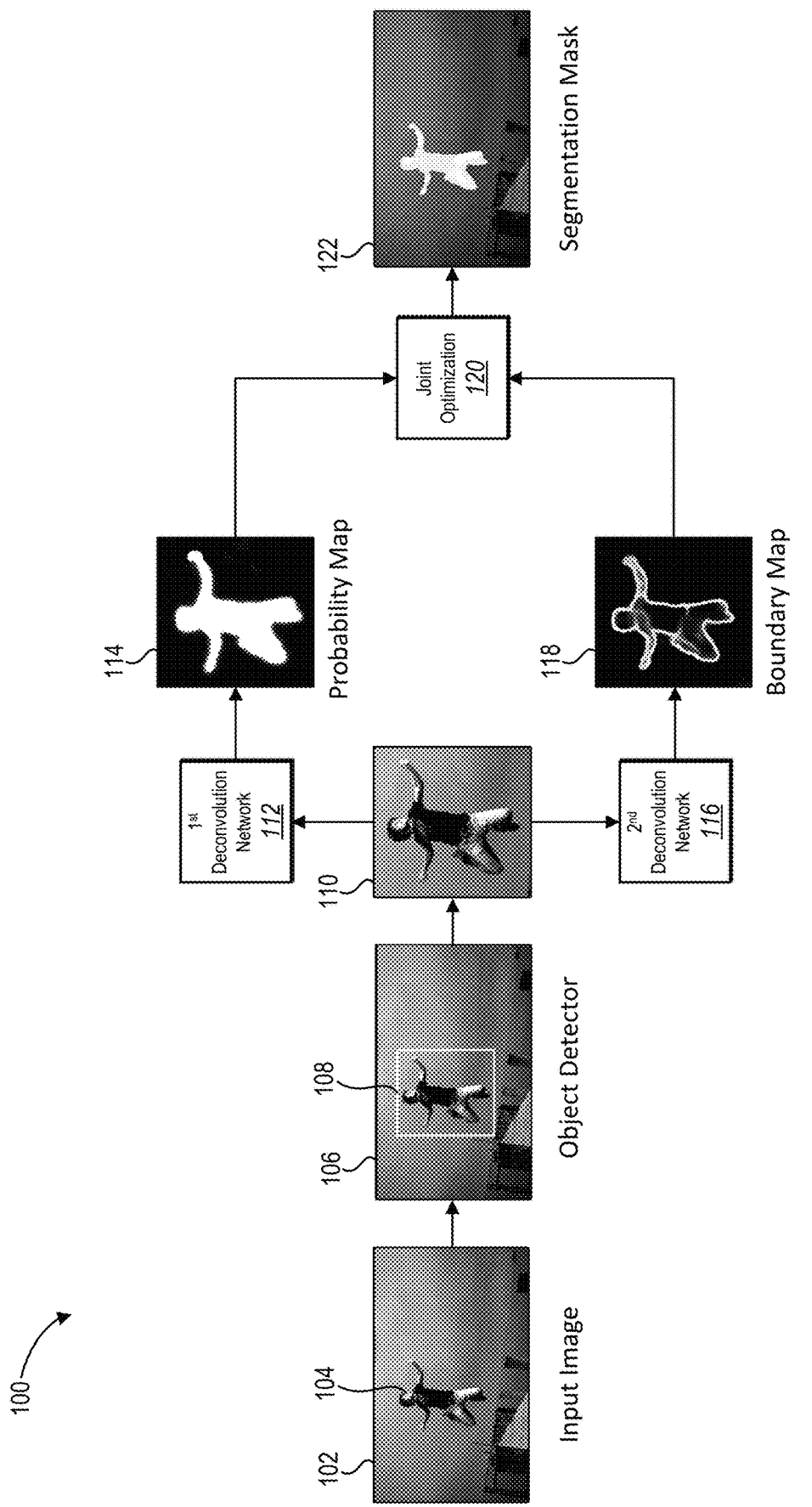
FIG. 1 illustrates a diagram of a process of generating a segmentation mask of an object in a digital image in accordance with one or more embodiments.

One or more embodiments of the present disclosure include a digital segmentation system that identifies and selects pixels corresponding to an object (e.g., a person) portrayed in digital visual media. For instance, the digital segmentation system identifies an object portrayed in a digital image utilizing deep learning techniques in combination with an optimization process to generate a segmentation mask that accurately identifies pixels corresponding to the object. In particular, the digital segmentation system uses deep learning techniques in combination with an optimization process to accurately match a segmentation mask to the edges an object portrayed in a digital image. The accuracy of the resulting segmentation mask provides image segmentation results that are significantly more accurate than conventional systems. As such, the digital segmentation system disclosed herein allows a user to quickly and easily segment a digital image to identify an object portrayed in the digital image for photo editing purposes (e.g., obtaining a cutout of the object to edit, remove an object from a digital image, or add an object to another digital image).

More specifically, in one or more embodiments, the digital segmentation system processes a digital image using a first neural network to generate a probability map indicating a probability that each pixel of the digital image is part of the object. In addition, the digital segmentation system processes the digital image using a second neural network to generate a boundary map that predicts the pixels within the digital image that correspond to the edges of the object. Using the pixels identified in both the probability map and the boundary map, the segmentation system optimizes a segmentation mask to accurately match the object portrayed in the digital image.

For instance, in order to optimize a segmentation mask, the digital segmentation system fuses pixel data from the probably map and the boundary map to generate a refinement map. The refinement map indicates pixels within the digital image that are identified both as object pixels in a probability map and as edge pixels in a boundary map. Using the refinement map as a guide, the digital segmentation system iteratively optimizes the segmentation mask by focusing on areas of the digital image that are proximate the edges of the object as indicated by the refinement map. Accordingly, with each iteration of the optimization process, the digital segmentation system gradually fits a mask boundary of the segmentation mask to the edges of the object portrayed in the digital image.

To further promote generating an accurate segmentation mask, the digital segmentation system uses an object detection process to create a cropped portion of a digital image that includes an object, and then uses the cropped portion to generate and optimize a segmentation mask, as briefly explained above. In particular, and unlike conventional systems, the digital segmentation system detects whether a portion of an object is missing from a cropped portion of a digital image. In one or more embodiments, upon detecting that a cropped portion may not include all portions of an object portrayed in an image, the digital segmentation system iteratively increases the size of the cropped portion to capture any missing portions of the object prior to generating and optimizing a segmentation mask for the object.

By utilizing enhanced object detection, deep learning techniques, and an iterative optimization process, the digital segmentation system detects an object portrayed in a digital image quickly and accurately. Indeed, in one or more embodiments, the digital segmentation system automatically (i.e., without user input indicating objects, background, or boundaries) identifies an accurate set of pixels representing the object portrayed in the digital image. Accordingly, the digital segmentation system significantly reduces the difficulty and the amount of time required for a user to segment a digital image to select/identify an object portrayed in the digital image. Additional features and advantages of the digital segmentation system will be further discussed below. As an overview, FIG. 1 illustrates an input image 102 that portrays an object 104 that a user seeks to segment. Additional detail of example embodiments of the segmentation system will now be provided with reference to the figures. Accordingly, FIG. 1 illustrates a process flow 100 that shows an example sequence of systems and methods to segment an image to identify object portrayed within a digital image.

As used herein, the term "object" refers to a portrayal of a person or thing in digital visual media (digital images or digital videos). One example of an object is a human individual portrayed in a digital image. In particular, with reference to the figures discussed below, the digital segmentation system will be described with example digital images in which the object is a person. The term "object," however, can also refer to a non-human object. For instance, other examples of an object can include an animal (e.g., a dog), a landscape feature (e.g., a mountain), or a man-made item (e.g., a car or building). As such, the term "object" generally refers to a portrayal of a person or item in a digital image that a user seeks to identify.

As used herein, the term "segment" refers to identifying pixels within a digital visual media that represent an object. In particular, the term "segment" refers to the process of delineating between pixels that correspond to an object portrayed in a digital visual media and pixels that correspond to a background of the digital visual media. The term "background" refers to all pixels within a digital visual media that do not correspond to a particular object that a user seeks to segment. As an example, the term "segment" includes identifying a set of pixels that make up a person portrayed in a digital image.

As shown in FIG. 1, in one or more embodiments, a digital segmentation system includes an object detector 106 that detects the object 104 within the input image 102 to generate a cropped portion 110 that includes the object 104. As further shown in FIG. 1, a first deconvolution network 112 analyzes the cropped portion 110 to generate a probability map 114, and in addition, a second deconvolution network 116 analyzes the cropped portion 110 to generate a boundary map 118. Using the probability map 114 and boundary map 118, the digital segmentation system performs a joint optimization 120 process to generate a segmentation mask 122 corresponding to the object 104, as shown in FIG. 1. Additional detail with respect to each component of the process flow 100 will provided below.

In particular, FIG. 1 illustrates an input image 102 that portrays an object 104 and a background (i.e., pixels of the input image 102 that do not make up the object). Depending on the embodiment, the input image 102 can comprise any type of digital visual media. As used herein, the term "digital visual media" refers to digital data capable of producing a visual representation. For instance, the term "digital visual media" includes digital images and digital video. As used herein, the term "digital image" refers to any digital symbol, picture, icon, or illustration. For example, the term "digital image" includes digital files with the following file extensions: JPG, TIFF, BMP, PNG, RAW, or PDF. Accordingly, although FIG. 1 illustrates the input image 102 as a digital photo, the digital segmentation system can also segment objects from various other types of digital visual media.

In one or more embodiments, a user can interact with the digital segmentation system to identify the input image 102. For example, the user interacts with the digital segmentation system to import, upload, select, or otherwise cause the digital segmentation system to identify and/or access the input image 102. Additionally, in one or more embodiments, the digital segmentation system detects additional user interaction that causes the digital segmentation system to initiate a segmentation process. In some embodiments, for instance, the user interacts with one or more graphical elements within a graphical user interface that causes the digital segmentation system to segment the input image 102 to identify the object 104. Alternatively, in other embodiments, the digital segmentation system automatically segments the input image 102 to identify the object 104 upon receiving or otherwise identifying the input image.

After the digital segmentation system identifies the input image 102, one or more embodiments of the process flow 100 include an object detector 106, as illustrated in FIG. 1. In particular, and as mentioned above, the object detector 106 detects the object 104 within the input image 102 to generate a cropped portion 110 of the input image 102 that includes the object 104. For example, and as illustrated in FIG. 1, the object detector 106 detects the object 104 and generates a bounded area 108 around the object 104 (e.g., a polygon that surrounds the object 104). Although the bounded area 108 in FIG. 1 is a square area, in alternative embodiments the object detector 106 generates a bounded area with a different geometric configuration based on the size and/or shape of a particular object (e.g., rectangular, oval, circular). Notwithstanding the geometric configuration of the bounded area 108, the digital segmentation system crops the input image 102 to create a cropped portion 110 that includes the object 104.

By identifying the object 104 and creating the cropped portion 110, the object detector reduces the amount of background pixels that, in many digital images, would complicate the segmentation of the image 102. For instance, removing portions of the background of the input image 102 reduces the number of pixels provided as input to the first deconvolution network 114 and the second deconvolution network 118. Therefore, generally speaking, by reducing the number of pixels of input using the cropped portion 110, the digital segmentation system generates more accurate results compared to results using all pixels within the input image 102. Moreover, because the cropped portion 110 includes fewer pixels compared to the entire input image 102, the processing resources and processing time for performing the remaining segmentation steps are also reduced, leading to a faster output and better user experience.

Depending on a particular embodiment, the object detector 106 within the digital segmentation system can use a variety of techniques to detect the object 104. For example, the object detector 108 can analyze the input image 102 using a neural network to detect the object 104. In particular, in one or more embodiments, the object detector 108 is a region-based convolutional neural network (i.e., a RCNN) or a fast region-based convolutional neural network (i.e., a F-RCNN). For example, in one or more embodiments, the digital segmentation system utilizes F-CNN object detection, as described in R. Girshick, *Fast-rcnn*, IEEE International Conference on Computer Vision (2015), which is incorporated by reference herein in its entirety. The digital segmentation system can use other forms of object detection, depending on a particular embodiment.

Notwithstanding a particular technique to detect the object 104, the digital segmentation system can provide a variety of user experiences during the object detection process, depending on a particular embodiment. For example, in some embodiments, the digital segmentation system automatically detects the object 104 (e.g., without receiving user input) by determining the object 104 is the mostly likely object within the input image 102 that a user would want to identify. For instance, the digital segmentation system can determine an object is the most prominent object form amount a plurality of objects in an input image based on one or more of a relative object size, object position, or object focus with respect to other objects within a digital image. Using input image 102 of FIG. 1 as an example, the object detector 106 analyzes the visual features of the input image 102 and determines that a user will most likely desire to identify or select the individual compared to the building based on the center position of the individual and relatively larger size of the individual compared to the bottom corner position and smaller size of the building.

Alternatively, in one or more embodiments, the digital segmentation system uses the object detector to present a plurality of detected objects (e.g., presenting multiple bounding areas around each object of the plurality of detected objects) for user selection or confirmation. For example, the object detector 108 detects one or more objects in an input image, and based on the detected objects, the digital segmentation system provides each of the detected objects using a bounded area 108 or other similar identifier. The user then may select on one of the detected objects that the user wishes to identify. Upon receiving the user selection, the object detector 108 creates a cropped portion corresponding to the selected object.

Furthermore, in one or more additional embodiments, the digital segmentation system may allow a user to first indicate an object within an input image that the user desires to identify or segment from the image. For example, prior to the object detector analyzing an input image, a user may select (e.g., via a touch screen or a mouse) a particular object in an input image. Based on the user's selection, the object detector may then analyze the image to determine the dimensions of the bounded area 108 needed to encompass the object selected by the user. Once the object detector determines the bounded area 108, and as explained above, the object detector 108 can create the cropped portion 110 for further processing.

In addition to the above details with respect to the object detector 106, in one or more embodiments, the digital segmentation system uses an iterative process to verify that the object detector 106 determines a bounded area that fully encompasses an entire object (e.g., all portions of an object are included within the bounded area). Additional details with respect to verifying that the object detector 106 did indeed capture the entire object within the bounded area 108 will be explained further below with reference to FIGS. 4A-4B.

Upon creating the cropped portion 110, the digital segmentation system causes the cropped portion 110 of the input image 102 to be processed using two separate neural networks. As used herein, the term "neural network" refers to a machine-learning model that can be tuned (e.g., trained) based on training input to approximate unknown functions. In particular, the term "neural network" can include a model of interconnected digital neurons that communicate and learn to approximate complex functions and generate outputs based on a plurality of inputs provided to the model. For instance, the term "neural network" includes one or more machine learning algorithms. In other words, a neural network is an algorithm that implements deep learning techniques, i.e., machine learning that utilizes a set of algorithms to attempt to model high-level abstractions in data. Additional details with respect to the use of neural networks within the digital segmentation system are discussed below with respect to FIGS. 7-8.

As illustrated in FIG. 1, the digital segmentation systems utilizes the first deconvolution network 112 and the second deconvolution network 116 as the two separate neural networks to process the cropped portion 110 of the input image. Based on a particular embodiment, the first deconvolution network 112 and the second deconvolution network 116 can utilize various types of deconvolution networks. For example, in one or more embodiments, the first deconvolution network 112 and the second deconvolution network 116 are each a deconvolution network as described in H. Noh, S. Hong, and B. Han, *Learning deconvolution network for semantic segmentation*, IEEE International Conference on Computer Vision (2015), which is incorporated by reference herein in its entirety. The digital segmentation system, however, may use other types of deep learning neural networks, depending on a particular embodiment.

Similarly, the digital segmentation system tunes (e.g., trains) the first deconvolution network 112 with training input to generate a probability map. For instance, the digital segmentation system can train the first deconvolution network 112 using a series of image mask pairs. In particular, an image mask pair is a known data pair that includes an image portraying an object and a corresponding object mask that is known to accurately correspond to pixels representing the object (e.g., a ground truth mask). Indeed, using several image mask pairs, the digital segmentation system can train the first deconvolution network 112 to produce a fine-tuned deconvolution network for generating a probability map corresponding to an object within a cropped portion of an input image. As used herein, the term "fine-tuning" refers to training a neural network using a set of training data corresponding to a data domain. A "data domain," for purposes of this application, refers to a set of data that is related in one or more ways. For example, a set of training images that all include people can be used to fine-tune a neural network to accurately identify a person portrayed in an input digital image (e.g., the data domain would be image data that includes people). Additionally, a set of training images that portray cats can be used to fine-tune a neural network to accurately identify a cat portrayed in an input digital image (e.g., the data domain would be image data that includes cats). Additional information regarding the training of the first deconvolution network 112 and the second deconvolution network 116 is discussed further below with reference to FIG. 8.

As mentioned, and as illustrated in FIG. 1, the first deconvolution network 112 generates the probability map 114. The probability map 114 indicates the probability of each pixel of the cropped portion 110 of the input image 102 belongs to the object 104. In other words, the first deconvolution network provides a prediction that indicates whether each pixel within the cropped portion 110 of the input image 102 corresponds to the object 104 or the background. As such, in one or more embodiments, and as shown in FIG. 1, the probability map 114 includes either an object label (i.e., the white portion of the probability map) or a background label (i.e., the black portion the probability map 114) for each pixel within the cropped portion 110 of the input image 102.

In addition to tuning and utilizing the first deconvolution network 112, the digital segmentation system also tunes (e.g., trains) and utilizes the second deconvolution network 116. In particular, the digital segmentation system tunes the second deconvolution network 116 with training input to generate a boundary map. For instance, the digital segmentation system can train the second deconvolution network 116 using a series of image boundary pairs. In particular, an image boundary pair is a data pair that includes an image portraying an object and a corresponding object boundary (e.g., ground truth boundary) that is known to accurately correspond to the edges of the object portrayed in the image. Indeed, using the image boundary pairs, the digital segmentation system trains the second deconvolution network 116 to produce a fine-tuned deconvolution network for generating a boundary map corresponding to the boundary of an object within a cropped portion of an input image.

As stated above, the digital segmentation system utilizes the second deconvolution network 116 to generate the boundary map 118. The boundary map 118 indicates pixels within the cropped portion 110 of the input image 102 that correspond to the edge or boundary of the object 104. As used herein, the term "edge" refers to pixels that correspond to an object portrayed in a digital image and are located directly proximate to one or more pixels that correspond to background. In other words, the edge of an object can be understood as the pixels corresponding to the object that create an outline of the object. For example, and as shown in FIG. 1, the boundary map 118 indicates pixels that the second deconvolution network 116 predicted to correspond to the edge of the object 104. In one or more embodiments, the boundary map 118 is a binary map where edge pixels are labeled as 1 (i.e., the white portion of boundary map 118) and non-edge pixels are labeled as 0 (i.e., the black portion of boundary map 118). Accordingly, FIG. 1 illustrates the boundary map 116 appears as a rough outline of the individual (i.e., object 104) portrayed in the input image 102.

More specifically, to generate the boundary map 118, the digital segmentation system trains the second deconvolution network using a training set of boundary pairs. In particular, the a boundary pair includes a digital training image portraying an object, and an associated ground mask that identifies each pixel corresponding to the edge of the object in the digital training image. As such, the digital segmentation system trains the second convolution network to identify edges of an object portrayed in a digital input image. Additional information regarding the training of the deconvolution networks is discussed further below with respect to FIG. 8.

Upon generating the probability map 114 and the boundary map 118, the digital segmentation system uses the pixel identification information included within the probability map 114 and the boundary map 118 to perform joint optimization 120 to obtain the segmentation mask 122, as illustrated in FIG. 1. In general, the joint optimization 120 improves the accuracy of the mask boundary of the segmentation mask 122. In other words, the joint optimization 120 optimizes the fit of the mask boundary to the edge of the object 104, and therefore, the joint optimization 120 results in a segmentation mask 122 where the mask boundary fits or matches the edge of the object with a high degree of accuracy.

In particular, FIG. 1 illustrates the segmentation mask 122 that the digital segmentation system provides as an output. As used herein, the term segmentation mask refers to data output of the digital segmentation system that identifies a set of pixels corresponding to an object portrayed in an input image. For example, the term "output mask" includes a set of pixels reflecting an individual portrayed in a digital image produced by a trained neural network. As illustrated in FIG. 1, the segmentation mask 122 segregates pixels corresponding to the object 104 in the input image 102 from other pixels, such as background pixels. In particular, the highlighted pixels in the segmentation mask 122 correspond to pixels representing the object 104 in the input image 102, and accordingly, the non-highlighted pixels in the segmentation mask 122 correspond to background pixels in the input image 102 (i.e., pixels that are not part of the object 104).

Figure 2:
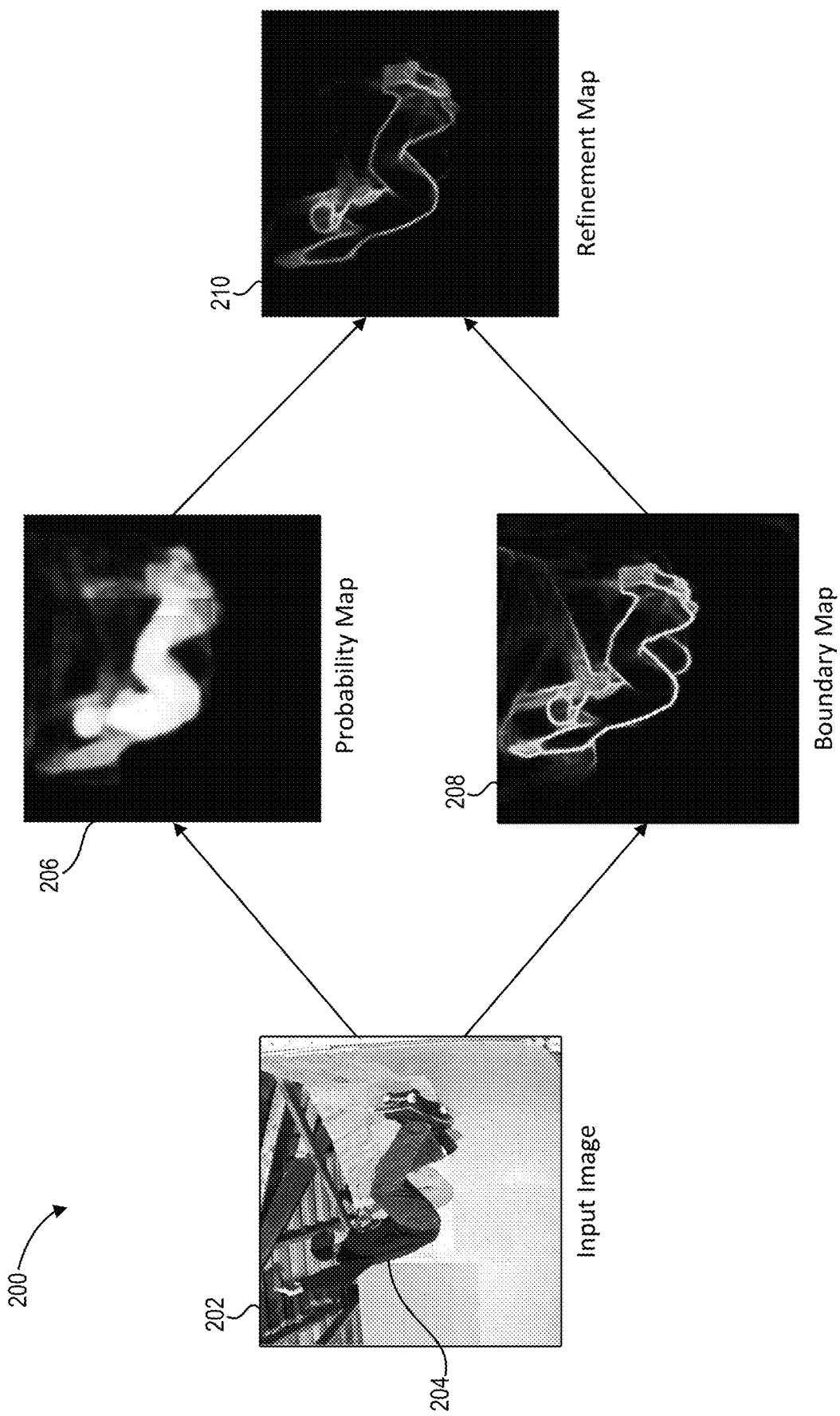
FIG. 2 illustrates a diagram of a process of generating a refinement map from a digital image in accordance with one or more embodiments.
Figure 3:
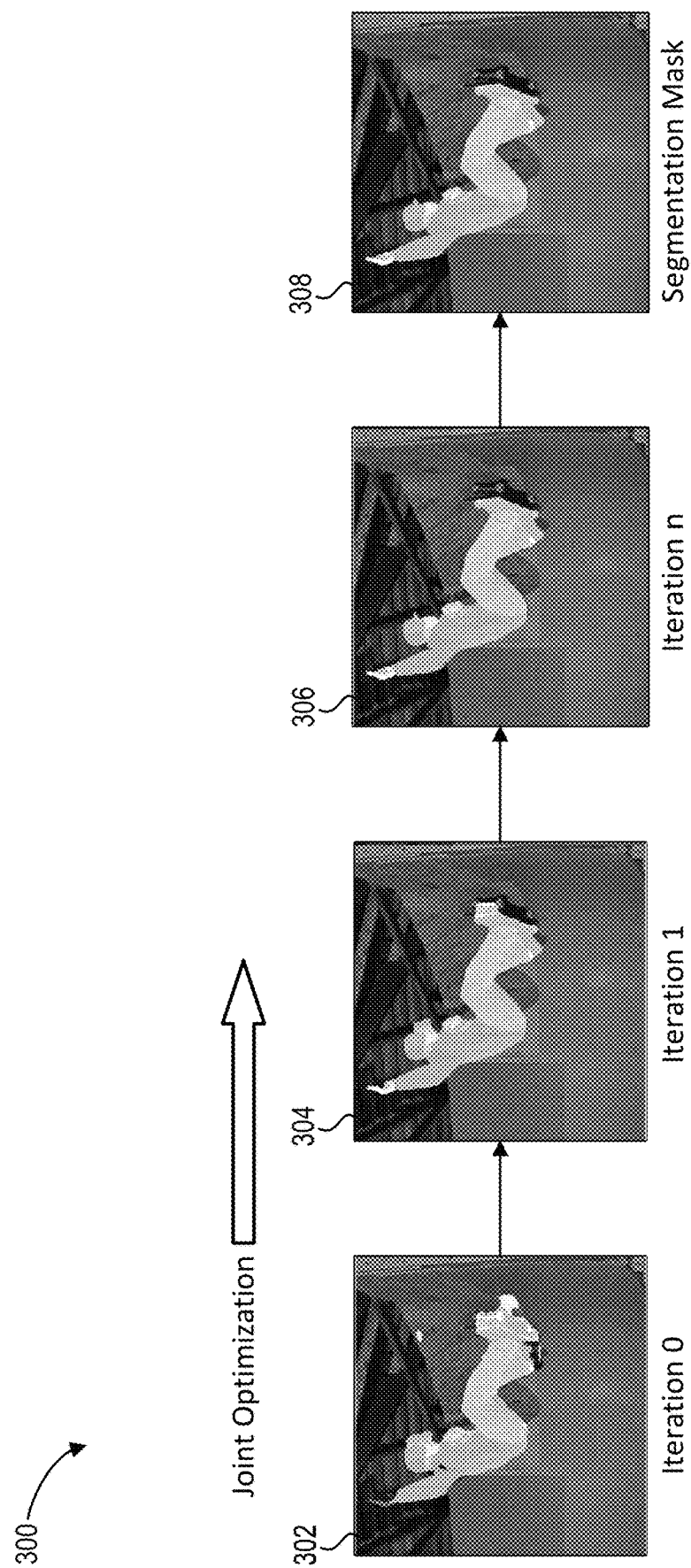
FIG. 3 illustrates a diagram of a process of optimizing a boundary of segmentation mask in accordance with one or more embodiments.

Referring now to FIGS. 2-3, additional detail is provided with respect to the joint optimization 120 process. Specifically, FIG. 2 illustrates a process flow 200 that the digital segmentation system utilizes to generate a refinement map during joint optimization 120. For example, and as shown in FIG. 2, the digital segmentation system identifies or otherwise accesses an input image 202 that includes an object 204. As explained above, the digital segmentation system detects the object 204, creates a cropped portion including the object 204, and generates a probability map 206 and a boundary map 208 using one or more of the systems and methods discussed above with reference to FIG. 1.

After obtaining the probability map 206 and the boundary map 208, the digital segmentation system uses the probability map 206 and the boundary map 208 to generate a refinement map 210, as illustrated in FIG. 2. In particular, the digital segmentation system fuses the pixel identification information included in the probability map 206 and the boundary map 208 to generate the refinement map 210. To fuse the probability map 206 and the boundary map 208, the digital segmentation system determines boundary refinement pixels (e.g., the white portion of boundary map 210) by identifying pixels that are labeled as object pixels within the probability map 206 and also labeled as edge pixels within the boundary map 208. Accordingly, the boundary map 210, as shown in FIG. 2, indicates boundary refinement pixels that the digital segmentation system uses in the joint optimization to generate a segmentation mask.

In particular, in one or more embodiments, the digital segmentation system computes for each pixel i, the refinement map as, $$R_i = P_i \cdot B_i$$

where P denotes the probability map, B denotes the boundary map, and R denotes the refinement map. For example, for a pixel i within the input image 202, the digital segmentation system computes $R_i$ based on whether or not the pixel i is identified as an object pixel in the probability map 206, and further based on whether or not the pixel i is identified as an edge pixel in the boundary map 208. For instance, if the pixel i is labeled an object pixel in the probability map 206 and is also labeled an edge pixel in the boundary map 208, then the pixel will be labeled as a boundary refinement pixel in the refinement map 210.

Using the boundary refinement pixels identified in the refinement map 210, the digital segmentation system iteratively solves an energy function (discussed in detail further below) to optimize the fit of a mask boundary of a segmentation mask to an edge of the object 204. As an overview of the joint optimization, FIG. 3 visually illustrates various iterations 302, 304, and 306 of the joint optimization that the digital segmentation system performs to generate the segmentation mask 308. As illustrated in FIG. 3, as the joint optimization proceeds through the various iterations 302, 304, and 306, the mask boundary of the segmentation mask gradually fits precisely to the edges of the object.

For example, at iteration 302, the segmentation mask includes multiple false positive and false negative pixel identifications for the object, especially around the edge of the object. In particular, at iteration 302, the individual's raised hand is identified as a false negative (e.g., the individual's hand is incorrectly identified as background). Other false negative identifications exist at iteration 302, such as the false negative portions located near the shoulder and at the feet of the individual, as shown in FIG. 3. In addition, iteration 302 includes false positive identifications (e.g., portions of the background incorrectly identified as object pixels). For example, FIG. 3 illustrates that in iteration 302 the skateboard wheels, a portion of the skateboard ramp, and background around the individual's head are incorrectly identified as object pixels. The joint optimization that the digital segmentation system performs thereby reduces or eliminates the false negative and false positive errors.

In particular, and as FIG. 3 illustrates, as the digital segmentation system iteratively optimizes the energy equation, the mask boundary precisely fits the edges of the object with increasing accuracy. For instance, iteration 304 illustrates that the digital segmentation system has optimized the fit of the mask boundary to correctly identify the individual's hand as part of the object. In other words, from iteration 302 to iteration 304, the digital segmentation system optimized the mask boundary to correct the false negative pixel identifications in the area around the individual's hand.

In addition to correcting false negative pixel identifications, iteration 304 further illustrates that the digital segmentation system optimized the mask boundary to correct false positive pixel identifications from iteration 302. For example, iteration 304 illustrates that the mask boundary is more closely fitted to the individual such that the skateboard wheels and the portion of the skateboard ramp are now not identified as object pixels. Moreover, the mask boundary near the individual's head is now more aligned with the individual such that the area of the false positive pixel identifications is much smaller compared to iteration 302.

In addition to optimizing the mask boundary to correct false negative and false positive pixel identifications around the edges of an object, the joint optimization performed by the digital segmentation system also optimizes boundary smoothness. Specifically, in iteration 302, the mask boundary corresponding to the edge of the individuals back appears rough and inconsistent. In iteration 304, however, the digital segmentation system optimizes the mask boundary corresponding to the edge of the individuals back resulting in a smooth and well-defined mask boundary that more accurately fits with the edge of the individual portrayed in the image.

The digital segmentation system performs joint optimization iterations to obtain or otherwise provide as an output, the segmentation mask 308. The number of iterations that the digital segmentation system performs can include any number "n" of iterations as needed to obtain an accurate segmentation mask, as indicated by iteration 306. In one or more embodiments, the digital segmentation system performs up to "n" joint optimization iterations by comparing results from a previous iteration with results from a current iteration. For example, in some embodiments the digital segmentation system compares the previous iteration with a current iteration to compute whether the results of the two iterations are within a defined matching threshold. For instance, a defined matching threshold can include computing a percentage of object pixels and/or background pixels in the current iteration that are also identified as object pixels and/or background pixels, respectively, in the previous iteration. Alternatively, the digital segmentation system performs a pre-defined number of joint optimization iterations to generate the segmentation mask 308.

Therefore, as shown in FIG. 3, joint optimization iteratively fits the mask boundary of the segmentation mask 308 to the edges of the individual to allow for accurate segmentation of the object. As mentioned above, to perform the joint optimization, the digital segmentation system iteratively optimizes an energy function. In one or more embodiments, the energy function formulation is a combination of color modeling and boundary modeling. More specifically, the energy function can be written as, $$E = \sum_{i \in k} U(i) + \gamma \cdot \sum_{(i,j) \in \Omega} V(i, j)$$

where U is a unary term which consists of iterative color modeling using k Gaussian mixture models, V is a binary term measuring the piecewise smoothness, j is the neighboring pixel of i in $\Omega$, and $\gamma$ is a constant that controls the effect of V. To compute the binary term V, the formulation can be written as, $$V(i, j) = \max\left(0, 1 - \beta \cdot \frac{R_i + R_j}{2}\right) \cdot \delta(L_i \neq L_j)$$

where $\beta$ is a constant that controls the influence from the boundary refinement map R, and $\delta$ indicates that that V will only make a measurement when pixel i and pixel j are labeled differently (e.g., pixel i is labeled as an object pixel and pixel j is labeled as a background pixel).

In one or more embodiments, the digital segmentation system solves the energy function using an iterative graph cut algorithm that causes the mask boundary of the segmentation mask to gradually be fitted to the edge of an object portrayed in an input image during several iterations. For example, in one or more embodiments, the digital segmentation system utilizes the iterative graph cut algorithm as described in C. Rother, V. Kolmogorov and A. Blake, *Grabcut-interactive foreground extraction using iterated graph cuts*, ACM Transactions on Graphics, SIGGRAPH (2004), which is incorporated by reference herein in its entirety.

In practice, and based on the binary function defined above, the binary term V will be small when pixels i and j are both labeled as boundary refinement pixels within the boundary refinement map R (e.g., pixels corresponding to an edge of a object). Alternatively, the binary term V will be large when pixels i and j are labeled different from one another. Accordingly, when the binary term V is integrated with color modeling using the energy function defined above, the binary term V causes the energy function to focus on the areas of the input image that mainly include the edge of the object. Thus, using an iterative cut graph algorithm to solve the energy equation, the digital segmentation system jointly optimizes the color modeling and boundary modeling to accurately generate a segmentation mask for an object portrayed in an input image.

In one or more embodiments, the digital segmentation system further performs a morphological operation to fill in any tiny holes within the segmentation mask in a post processing operation. In particular, because the digital segmentation system optimizes the mask boundary of the segmentation mask, a morphological fill operation can assume that any pixels located within an area defined by the mask boundary are to be identified as object pixels. Accordingly, the digital segmentation system further increases the accuracy of the segmentation map using the fill operation.

Figure 4A:
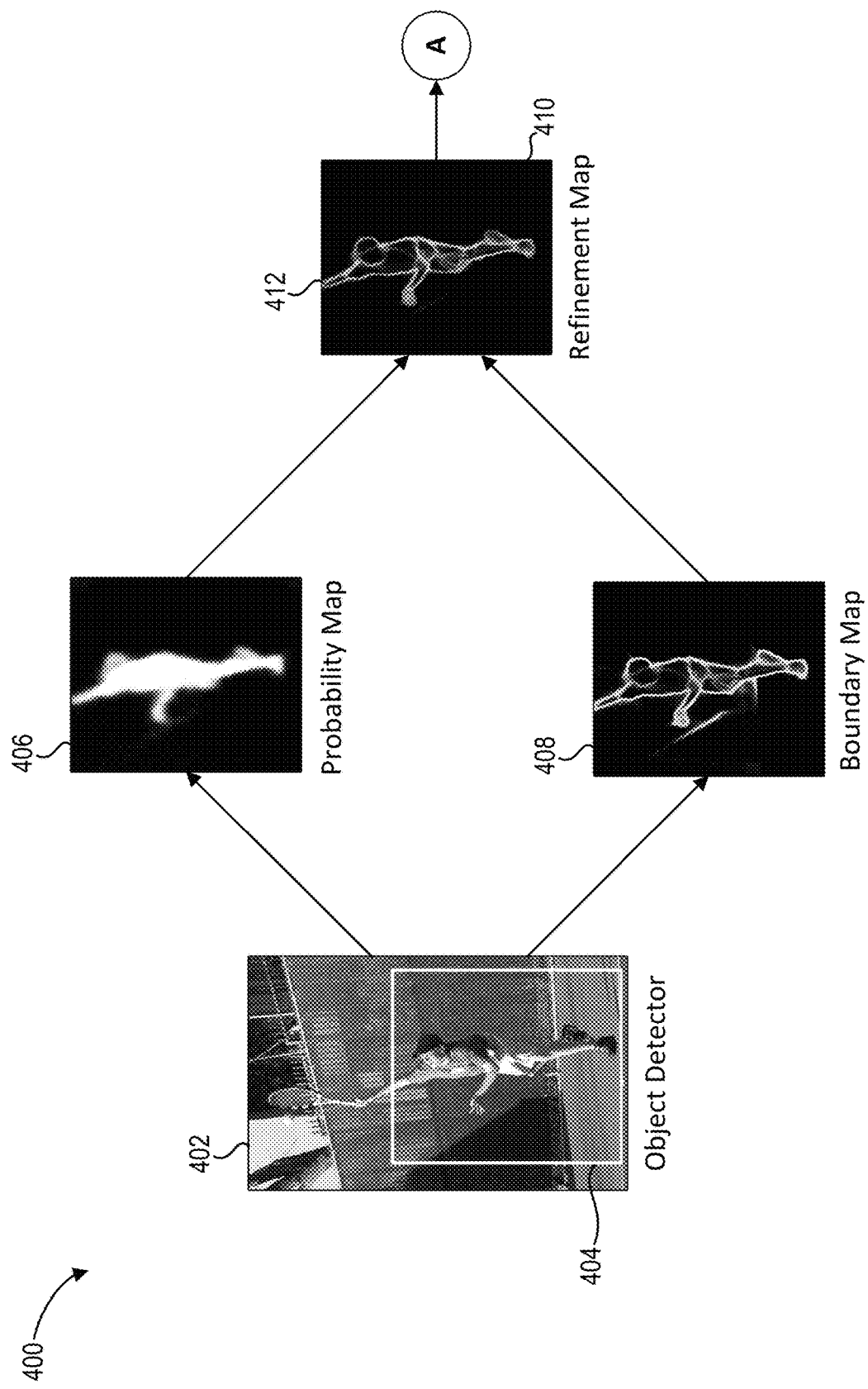
FIG. 4A illustrates a diagram of a process of detecting an object in a digital image in accordance with one or more embodiments.

As mentioned above, and with reference now to FIGS. 4A-4B, in one or more embodiments, the digital segmentation system performs iterative object detection to verify that the entirety of an object is within a cropped portion provided to the deconvolution networks. For instance, based on a pose of an individual portrayed in an image, light/shadow characteristics of the input image, or other factors, the digital segmentation system may fail to generate a bounded area that fully encompasses an object to be segmented (e.g., portions of the object are located outside of the bounded area). FIG. 4A illustrates an input image 402. The digital segmentation system performs object detection on input image 402 to generate bounded area 404. As shown in FIG. 4A, based on the pose of the individual, the digital segmentation system may fail to detect the individual's hand and generate the bounded area 404 that excludes a portion of the individual.

As described above in detail, the digital segmentation system creates a cropped portion based on the bounded area 404 and generates a probability map 406 and boundary map 408 that are then fused together to generate the refinement map 410. Using the refinement map 410, the digital segmentation system performs a check of the refinement map edges (e.g., the top, bottom, left, and right edges) to determine whether any of the refinement map edges include boundary refinement pixels. In other words, the digital segmentation system detects when boundary refinement pixels intersect, or alternatively, are positioned within a pre-defined proximity of a refinement map edge. For example, and as shown in FIG. 4A, the top edge 412 of the refinement map 410 intersects with one or more boundary refinement pixels that correspond to the individual's arm.

Figure 4B:
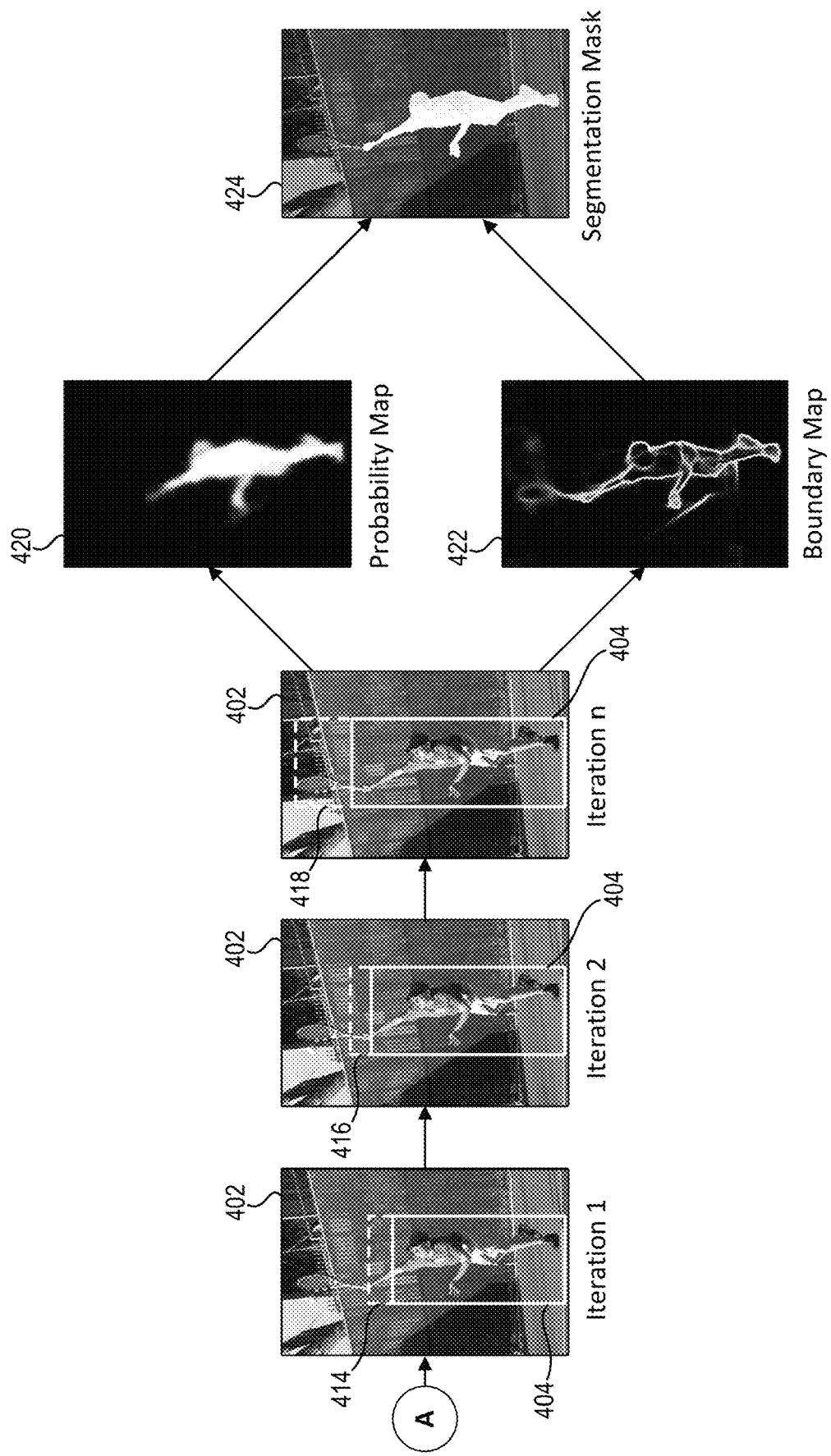
FIG. 4B illustrates a diagram of a process of detecting additional portions of the object in the digital image that were undetected in FIG. 4A in accordance with one or more embodiments.

Upon detecting that one or more boundary refinement pixels are located at an edge of the refinement map 410, the digital segmentation system repeats the object detection process to capture any portions of the object that were excluded during the initial object detection, as shown in FIG. 4B. In particular, the digital segmentation system determines the direction to expand the bounded area 404 based on the particular edge or edges where boundary refinement pixels are located. For example, and as illustrated in FIG. 4B, the digital segmentation system can expand the bounded area 404 upward based on determining that the boundary refinement pixels interacted with the top edge of the refinement map 410. In particular, the digital segmentation system can increase the size of the bounded area 404 by adding an expanded portion 414, as indicated in FIG. 4B.

Using the bounded area 404 with the expanded portion 414, the digital segmentation system again performs the various processes discussed above to generate a refinement map of an expanded cropped portion, which the digital segmentation system then checks again to determine whether one or more boundary refinement pixels are included along any of the edges of the refinement map. Accordingly, the digital segmentation system performs an iterative object detection process that iteratively expands the bounded area 404 until a refinement map of a cropped portion of the input image 402 based on the expanded bounded area 404 indicates that boundary refinement pixels do not intersect or are otherwise located a threshold distance away from the edges of the refinement map.

For example, and as illustrated in FIG. 4B, the digital segmentation system performs three iterations of objection detection, where the digital segmentation system adds one of expanded portions 414, 416, and 418 in each of the iterations, respectively. Moreover, and as illustrated in FIG. 4B, the digital segmentation system uses the third iteration of the bounded area 404 to create a cropped portion of input image 402 used to generate probability map 420 and boundary map 422 using the methods and techniques described above. In particular, and as shown in FIG. 4B, the probability map 420 and the boundary map 422 fully include the entirety of the individual. As such, the digital segmentation system will verify using a refinement map based on the probability map 420 and the boundary map 422 that no refinement boundary pixels intersect or are otherwise located within threshold proximity of the edges of the refinement map.

Based on determining that the entirety of the individual is included in the refinement map, the digital segmentation system proceeds to joint optimization to generate segmentation mask 424, as discussed in detail above with reference to FIGS. 2-3. In particular, FIG. 4B illustrates that segmentation mask 424 includes the forearm and hand region of the individual that was originally undetected. Accordingly, in one or more embodiments, the digital segmentation system performs iterative object detection that, when used in combination with the deep learning and optimization techniques described herein, further increases the accuracy of the segmentation mask 424.

As described above, the digital segmentation system provides increased accuracy in segmenting objects within a digital image. To illustrate, one or more advantages of the digital segmentation system, experimenters have conducted research to show that the digital segmentation system produces more accurate segmentations compared to conventional systems. In particular, experimenters created a segmentation benchmark dataset from MSCOCO (i.e., MS Common Objects in Context). The benchmark consisted of 467 images containing humans in various poses. The experimenters prepared ground truth masks for each image in the benchmark dataset and the evaluated the digital segmentation system described herein against two conventional systems. The results of the evaluation were then analyzed qualitatively and quantitatively.

Figure 5A:
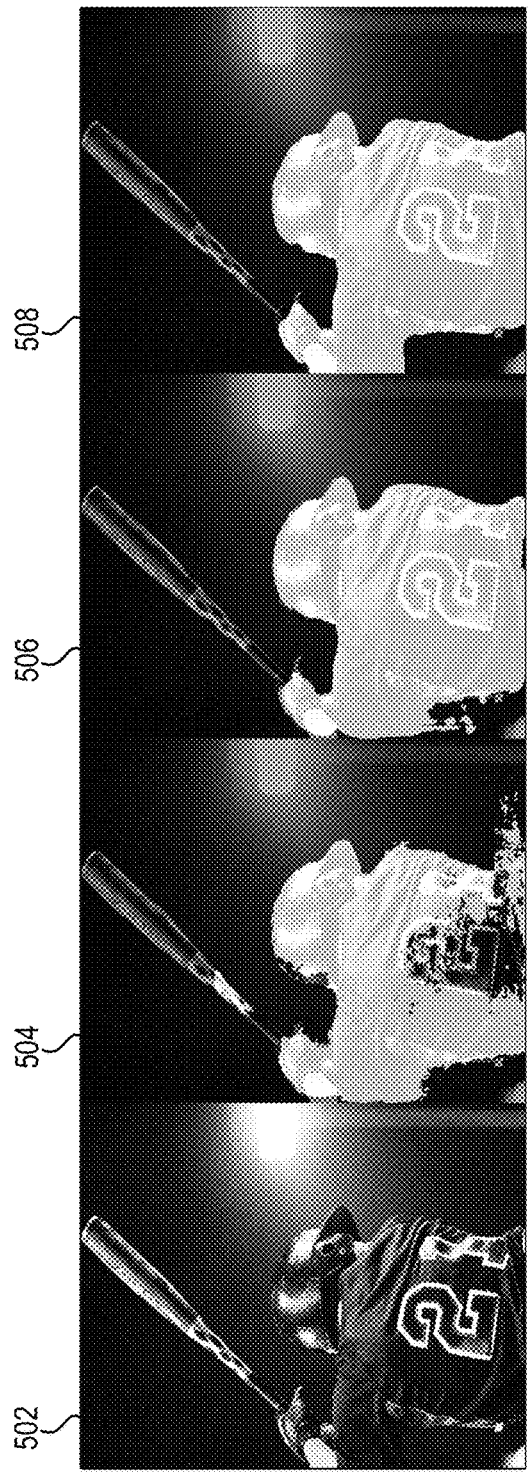
FIG. 5A illustrates an example segmentation of a digital image that identifies an object in the digital image in accordance with one or more embodiments compared to example segmentations of the object using conventional systems.
Figure 5B:
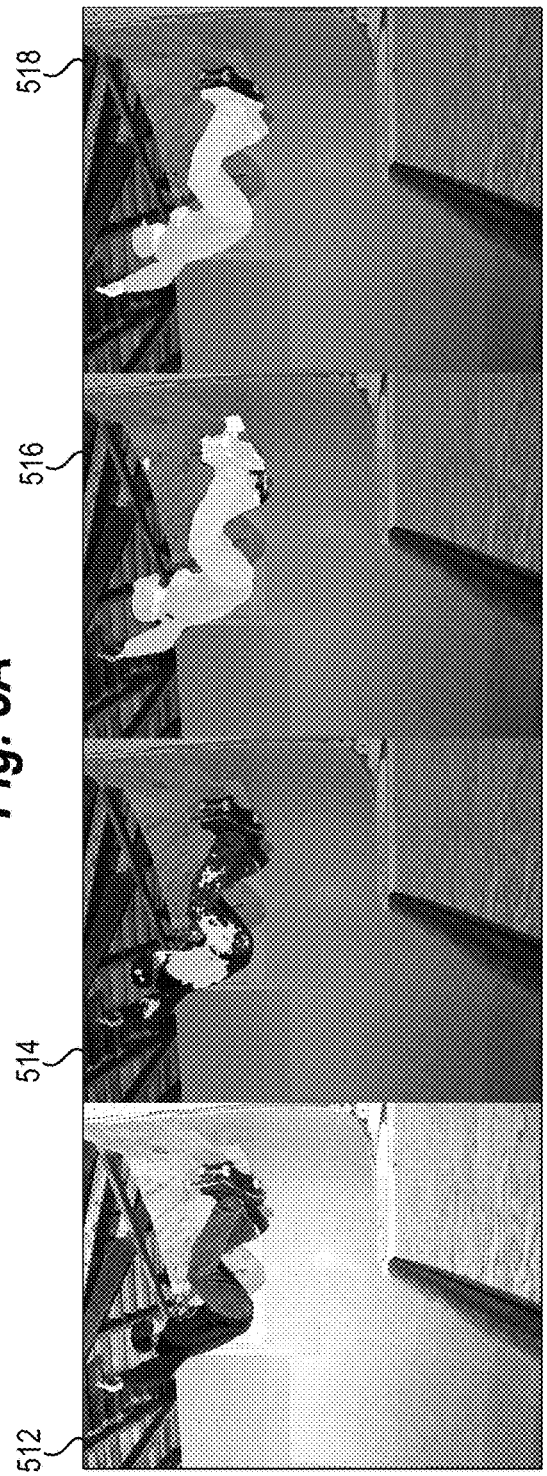
FIG. 5B illustrates another example segmentation of a digital image that identifies an object in the digital image in accordance with one or more embodiments compared to example segmentations of the object using conventional systems.

FIGS. 5A and 5B illustrate the qualitative results from the evaluation. In particular, FIG. 5A illustrates an input image 502. Result image 504 was produced using a conventional DeconvNet system. Result image 506 was produced using a fine-tuned conventional DeconvNet. Result image 508 was produced using the digital segmentation system described herein. For result image 506, it is seen that the generated segmentation mask is not accurate in that false positives and false negatives occur. For example, false negatives are present on the back of the shirt area and on the helmet, whereas false positives are also present on the lower right hand side of the individual.

With respect to result image 506, the results of the fine-tuned network are improved over the conventional DeconvNet alone. For example, result image 506 indicates a segmentation mask that more accurately predicts the individual's body. Incorrect pixel identification, however, still occurs around the boundary of the individual. For example, result image 506 demonstrates false positive and false negatives in the areas under the left-side arm of the individual and on the forearm of the left-side arm.

Finally, result image 508 demonstrates a segmentation mask generated using the digital segmentation system described herein. As indicated in result image 508, all the limitations shown in result images 504 and 508 are improved in result image 508. In particular, the mask boundary of the segmentation mask accurately matches the edges of the individual to create a segmentation mask that is demonstrably more accurate qualitatively compared segmentation masks generated using conventional systems.

As mentioned, FIG. 5B illustrates additional result images created during the evaluation of the digital segmentation system. In particular, FIG. 5B illustrates an input image 512. Result image 514 was produced using the conventional DeconvNet. Result image 516 was produced using a fine-tuned conventional DeconvNet. Result image 518 was produced using the digital segmentation system described herein. As with FIG. 5A, FIG. 5B demonstrates the superior accuracy of the segmentation mask that the digital segmentation system generates. In particular, result image 514 shows a very inaccurate segmentation mask that includes large numbers of false positive and false negative pixel identifications.

Although result image 516 improves the result based on fine-tuning the DeconvNet, the segmentation mask in result image 516 includes several false positive and false negative results, especially around the edges of the individual (e.g., the individual's hand, the individual's feet, and near the individual's head). Finally, result image 518 demonstrates that the accuracy of the segmentation mask generated by the digital segmentation system compared to the conventional methods. In particular, result image 518 demonstrates a segmentation mask that accurately fits the mask boundary to the edge of the individual portrayed in the input image 512.

Figure 6A:
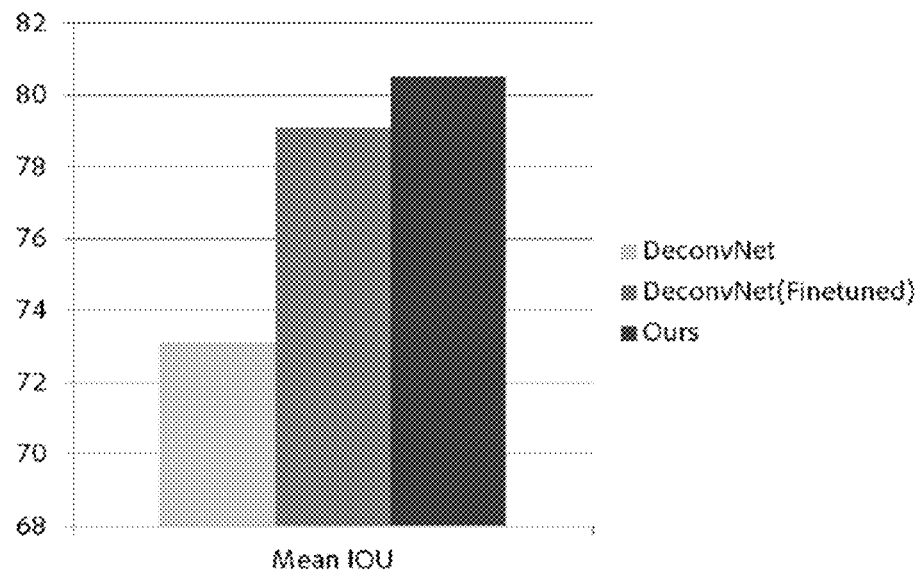
FIG. 6A illustrates results from experimentation conducted with regard to one or more embodiments.

In addition to the qualitative results shown in FIGS. 5A and 5B, FIGS. 6A and 6B illustrate quantitative results. In particular, the mean IOU (intersection verse union) across the benchmark dataset was calculated for each evaluated system. FIG. 6A illustrates a bar chart indicating the results. As shown in FIG. 6A, the digital segmentation system out performs the DeconvNet and the fine-tuned DeconvNet with a significantly higher mean IOU. Specifically, the DeconvNet had a mean IOU of 73.1, the fine-tuned DeconvNet had a mean IOU of about 79.2, while the digital segmentation system provided a mean IOU of between 80.5. The experimenters observed that the increase in mean IOU between the fine-tuned DeconvNet and the digital segmentation system is due in large part to the increased accuracy of the mask boundary for the segmentation mask generated by the digital segmentation system.

Figure 6B:
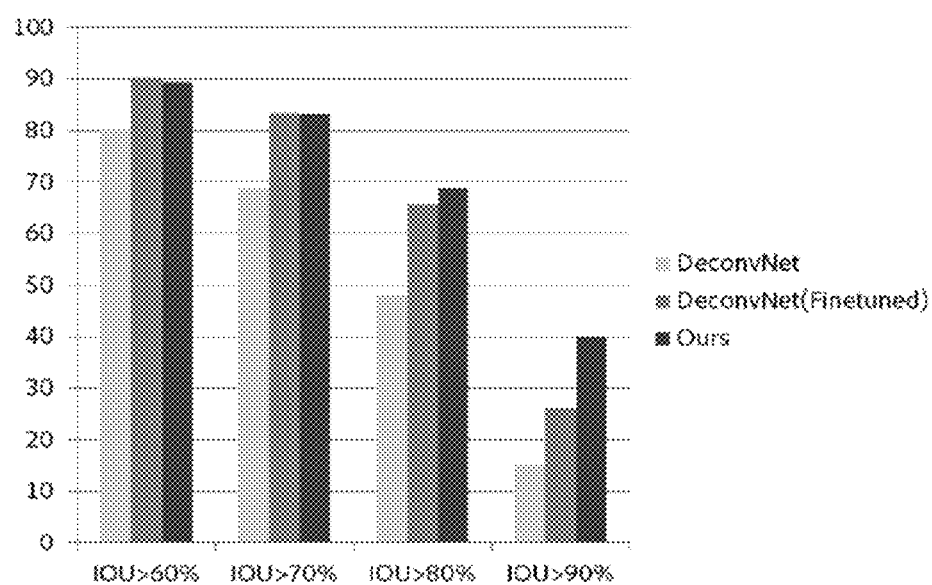
FIG. 6B illustrates additional results from experimentation conducted with regard to one or more embodiments.

In addition, the experimenters calculated the percentage of images having a mean IOU exceeding a predefined threshold for each evaluated system. FIG. 6B illustrates a bar graph showing the results of the calculations based on the evaluation. As shown in FIG. 6B, the digital segmentation system consistently outperformed the DeconvNet across all thresholds indicated. With respect to the fine-tuned DeconvNet, for threshold levels of IOU>60% and IOU>70%, the digital segmentation system has similar results. Significantly, however, for threshold levels of IOU>80% and IOU>90%, the digital segmentation system considerably outperformed the fine-tuned DeconvNet. The higher percentages of the optimized segmentation masks in the higher IOU thresholds clearly demonstrates the ability of the digital segmentation system to achieve the most accurate results compared to conventional systems.

As indicated above in the explanation of FIG. 1 with respect to the first deconvolution network 112 and the second deconvolution network 116, FIG. 7 illustrates, an example deconvolution network the digital segmentation system utilizes to generate a probability map and a boundary map. In particular, FIG. 7 illustrates a deconvolution neural network 700 in accordance with one or more embodiments. For example, the deconvolution neural network 700 illustrates an example neural network that can be trained using an image mask dataset to generate a probability map (e.g., the first deconvolution network 112 shown in FIG. 1). Additionally, the deconvolution neural network 700 illustrates an example neural network that can be trained using an image boundary dataset to generate a boundary map (e.g., the second deconvolution network 116 shown in FIG. 1). Additional information regarding the tuning or training process of deconvolution neural network 700 is discussed below with reference to FIG. 8.

As illustrated in FIG. 7, the deconvolution neural network 700 receives as input a digital image 702. For example, and as explained above, the deconvolution neural network 700 can receive as input a cropped portion of an input image. Upon receiving the digital image 702, the deconvolution neural network 700 processes the digital image 702 through a series of applied layers to generate an output map 704 (e.g., a probability map or a boundary map), as shown in FIG. 7. In particular, the deconvolution neural network 700 utilizes a plurality of convolution layers (labeled Conv 1 through Conv 6 in FIG. 7) and a plurality of deconvolution layers (labeled Deconv 1 through Deconv 6 in FIG. 7). Utilizing these layers, the deconvolution neural network 700 generates the output map 704.

The series of convolution layers illustrated in FIG. 7 are representative of layers that apply a number of convolutional kernels. The convolutional kernels are trained to extract important features from the digital image 702, such as edges, corners or other informative region representations. Furthermore, the series of deconvolution layers are layers that included deconvolutional kernels that are trained to upsample the previous layers. Moreover, various convolution layers and deconvolution layers typically have particular functions. For example, the deconvolution neural network 700 may utilize one or more pooling layers, loss layers, or other layer(s) having a particular function. For example, in one or more embodiments, the probability map 114 is extracted from the first deconvolution network 112 before the softmax layer of the first deconvolution network 112. The various layers of the deconvolution neural network 700 generate frameworks for a variety of computer vision tasks such as semantic segmentation, classification, and detection. Accordingly, and as described herein, these layers can assist in segmenting pixels representing an object portrayed in an input image from background pixels in the input image.

FIG. 8 illustrates a process flow 800 of the digital segmentation system tuning or training a first untrained deconvolution network 804 to produce a first trained deconvolution network 806. For example, the first trained deconvolution network 806 can represent the first deconvolution network 112 illustrated in FIG. 1 that generates a probability map. Moreover, FIG. 8 illustrates tuning or training a second untrained deconvolution network 808 to produce a second trained deconvolution network 810. For instance, the second trained deconvolution network 808 can represent the second deconvolution network 116 illustrated in FIG. 1 that generates a boundary map.

In particular, in one or more embodiments, the digital segmentation system trains deconvolution networks 804, 808 utilizing a repository of digital training images 802, as shown in FIG. 8. In particular, the digital segmentation system can train deconvolution networks 804, 808 by accessing or generating training input with regard to objects in the digital training images 802. Specifically, the digital segmentation system can access and/or generate training input using the training digital images 802, where each training digital image portrays an object with a known ground mask. The term "ground mask" refers to a known set of pixels reflecting an object portrayed in a digital image.

For example, and as briefly discussed above, each of the digital training images 802 can be part of a mask pair and a boundary pair. In particular, the mask pair includes a digital training image portraying an object, and an associated ground mask that identifies each pixel corresponding to the object (e.g., a truth ground mask). Similarly, the boundary pair includes the digital training image portraying the object, and an associated ground mask that identifies each pixel corresponding to the edges of the object. As such, the digital training images 802 make up training input for the deconvolution networks 804, 808. As used herein, the term "training input" refers to information provided to train a neural network. The deconvolution networks 804, 808 utilize the training input to learn to accurately identify objects portrayed in input images, as explained above.

The digital training images 802 can comprise any group or collection of digital visual media items. For instance, in one or more embodiments, the digital training images 802 comprise a repository of digital images stored on a remote server. For example, in one or more embodiments, the repository comprises the PASCAL VOC segmentation dataset, the MS coco dataset, or another dataset. Furthermore, as mentioned above, the digital training images 802 include digital images with training object data where object pixels have been previously identified.

Figure 9:
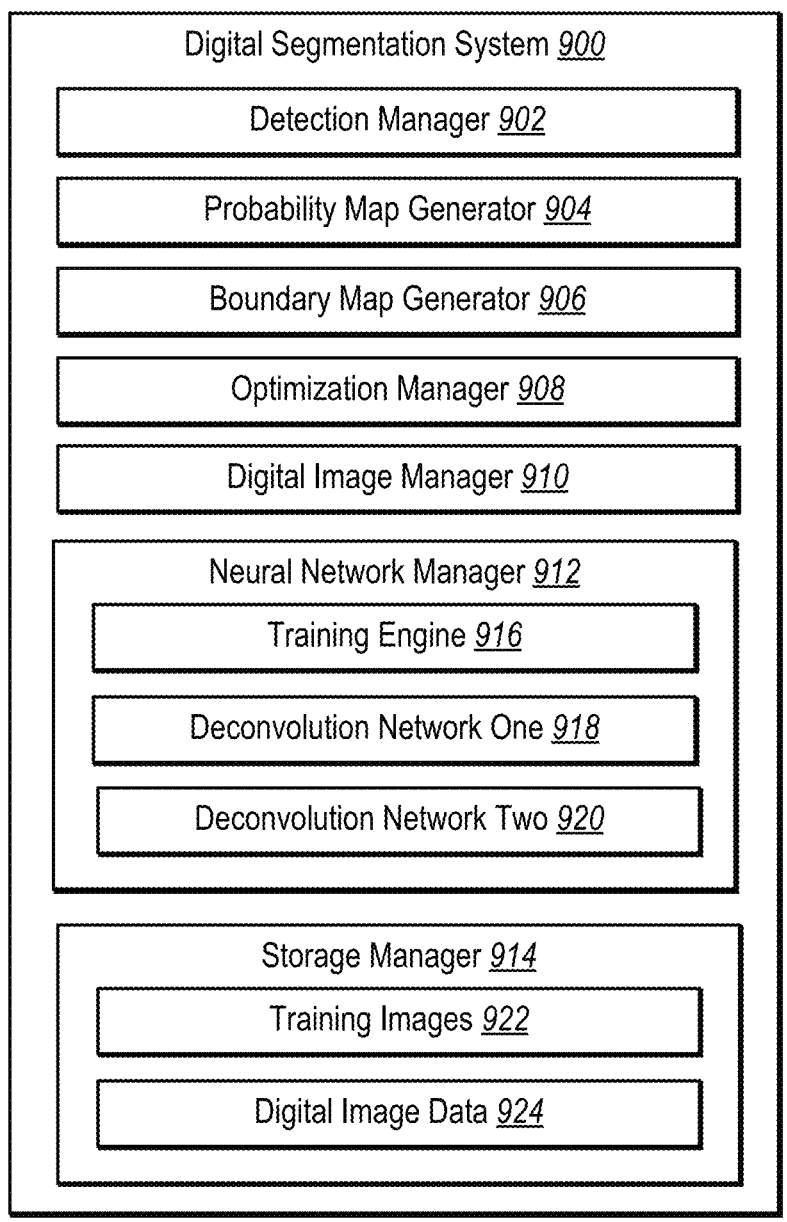
FIG. 9 illustrates a schematic diagram of a digital segmentation system in accordance with one or more embodiments.

Turning now to FIG. 9, additional detail will be provided regarding components and capabilities of one example architecture of a digital segmentation system according to one or more embodiments. In particular, FIG. 9 illustrates an embodiment of an exemplary digital segmentation system 900 (e.g., "digital segmentation system," described above). As shown, the digital segmentation system 900 may include, but is not limited to, a detection manager 902, a probability map generator 904, a boundary map generator 906, an optimization manager 908, a digital image manager 910, a neural network manager 912, and a storage manager 914. The neural network manager 912 further includes a training engine 916, a first deconvolution network 918, and a second deconvolution network 920. Moreover, the storage manager 914 includes training image repository 922 and digital image data 924.

As illustrated in FIG. 9, the digital segmentation system 900 includes the detection manager 902. In particular, detection manager 902 performs one or more methods to perform an initial detection of an object portrayed within an input image. For example, and as discussed above, the detection manager 902 detects an object within an input image and determines a bounded area that surrounds the detected object. Additionally, the detection manager 902 can create a cropped portion of the input image based on the determined bounded area, as described in detail above with respect to FIG. 1. Furthermore, the detection manager 902 can perform an iterative object detection method that uses the iterative process described with respect to FIGS. 4A-4B to verify that a cropped portion of an input image includes the entirety of the detected object.

As further illustrated in FIG. 9, the digital segmentation system 900 includes a probability map generator 904. For instance, the probability map generator 904 receives image data for which to generate a corresponding probability map. As explained above with reference to FIG. 1, for example, the probability map generator 904 receives a cropped portion of an input image that includes an object to segment. The probability map generator 904 then coordinates the utilization of a deconvolution network that in turn produces the probability map, as described in detail above with reference to FIGS. 1-2. For example, the probability map generator 904 coordinates with the neural network manager 912 to access the first deconvolution network 918 for generation of a probability map.

Similar to the probability map generator 904, the digital segmentation system 900 includes the boundary map generator 906. For instance, the boundary map generator 906 receives image data for which to generate a corresponding boundary map. As explained above with reference to FIG. 1, for example, the boundary map generator 906 receives a cropped portion of an input image that includes an object to segment. The boundary map generator 906 then coordinates the utilization of a deconvolution network that in turn produces the boundary map, as described in detail above with reference to FIGS. 1-2. For example, the boundary map generator 906 coordinates with the neural network manager 912 to access the second deconvolution network 920 for generation of a boundary map.

Furthermore, and as illustrated in FIG. 9, the digital segmentation system 900 includes the optimization manager 908. In one or more embodiments, the optimization manager 908 performs various calculations and/or functions to generate a segmentation mask that accurately fits to an object portrayed in an input image. In particular, and as described above with reference to FIGS. 1-3, the optimization manger 908 can generate a refinement map using pixel identification information contained in the probability map and the boundary map. Using the refinement map, the optimization manger 908 can iteratively solve an energy function, which in turn, iteratively fits a mask boundary for the segmentation mask to the edges of the object portrayed in the input image, and discussed in detail above with respect to FIG. 3.

Furthermore, as illustrated in FIG. 9, the digital segmentation system 900 also includes the digital image manager 910. The digital image manager 910 can access, identify, modify, revise, and/or provide digital images. Furthermore, the digital image manager 910 can receive selection information identifying an object, and accordingly, modify the digital image (e.g., the identified object pixels or background pixels). In particular, the digital image manager 910 can modify digital images or a portion of a digital image. For example, in one or more embodiments, the digital image manager 910 alters color, brightness, hue, or any other visual characteristic of a segmented object. Similarly, the digital image manager 910 can move, resize, rotate, or orient a segmented object portrayed in a digital image. Similarly, the digital image manager 910 can isolate, cut, and paste a segmented object portrayed in a digital image. Moreover, the digital image manager 910 can delete or remove a segmented object (or background) in a digital image.

As further illustrated in FIG. 9, the digital segmentation system 900 includes the neural network manager 912 that manages the training engine 916. The training engine 916 can teach, guide, tune, and/or train one or more neural networks. In particular, the training engine 916 can train a neural network based on a plurality of digital training images (e.g., training images 922). More specifically, the training engine 916 can access, identify, generate, create, and/or determine training input and utilize the training input to train and fine-tune a neural network. For instance, the training engine 916 can train the first deconvolution network 918 to generate a probability map, as well as train the second deconvolution network 920, as discussed above in detail with respect to FIGS. 1, 2, 7, and 8.

In addition, and as mentioned directly above, the neural network manager 912 can manage the training and the use of various neural networks. In particular, the neural network manager 912 manages the training and utilization of the first deconvolution network 918 and the second deconvolution network 920. The first and second deconvolution networks 918 and 920 can include one or all of the features and functions described above with respect to the first and second deconvolution networks 112 and 116 of FIG. 1, as well as the deconvolution network 700 described with respect to FIG. 7. Moreover, alternative to using deconvolution networks to generate the probability map and/or the boundary map, in one or more embodiments the probability map and/or the boundary map can be generated using other types of networks. For example, an FCN (fully convolutional network) or semantic boundary detector such as MCG/UCM boundary predictor can be used.

As illustrated in FIG. 9, the digital segmentation system 900 also includes the storage manager 914. The storage manager 914 maintains data for the digital segmentation system 900. The storage manager 914 can maintain data of any type, size, or kind as necessary to perform the functions of the digital segmentation system 900. The storage manager 914, as shown in FIG. 9, includes the training images 922. The training images 922 can include a plurality of digital training images associated with various ground masks (e.g., mask pairs and boundary pairs), as discussed in additional detail above with respect to FIG. 8. In particular, in one or more embodiments, the training images 922 include digital training images utilized by the neural network training engine 916 to train one or more neural networks to generate a probability map and a boundary map.

As further illustrated in FIG. 9, the storage manager 914 also includes digital image data 924. Digital image data 924 can include information for any digital image utilized by the digital segmentation system 900. For example, digital image data 924 includes a digital image provided by a user, where the user seeks to segment an object portrayed in the digital image. Digital image data 914 can also include information or data generated by the digital segmentation system 900 regarding digital images. For instance, digital image data 914 includes pixel identification, pixel labels, metadata, or other information regarding digital images utilized by the digital segmentation system 900.

Each of the components 902-914 of the digital segmentation system 900 and their corresponding elements (as shown in FIG. 9) may be in communication with one another using any suitable communication technologies. It will be recognized that although components 902-914 and their corresponding elements are shown to be separate in FIG. 9, any of components 902-914 and their corresponding elements may be combined into fewer components, such as into a single facility or module, divided into more components, or configured into different components as may serve a particular embodiment.

The components 902-914 and their corresponding elements can comprise software, hardware, or both. For example, the components 902-914 and their corresponding elements can comprise one or more instructions stored on a computer-readable storage medium and executable by processors of one or more computing devices. When executed by the one or more processors, the computer-executable instructions of the digital segmentation system 900 can cause a client device and/or a server device to perform the methods described herein. Alternatively, the components 902-914 and their corresponding elements can comprise hardware, such as a special purpose processing device to perform a certain function or group of functions. Additionally, the components 902-914 and their corresponding elements can comprise a combination of computer-executable instructions and hardware.

Furthermore, the components 902-914 of the digital segmentation system 900 may, for example, be implemented as one or more stand-alone applications, as one or more modules of an application, as one or more plug-ins, as one or more library functions or functions that may be called by other applications, and/or as a cloud-computing model. Thus, the components 902-914 of the digital segmentation system 900 may be implemented as a stand-alone application, such as a desktop or mobile application. Furthermore, the components 902-914 of the digital segmentation system 900 may be implemented as one or more web-based applications hosted on a remote server. Alternatively or additionally, the components of the digital segmentation system 900 may be implemented in a suit of mobile device applications or "apps." To illustrate, the components of the digital segmentation system 900 may be implemented in a digital image editing application, including but not limited to ADOBE® PHOTOSHOP® or ADOBE® REVEL®. "ADOBE®," "ADOBE® PHOTOSHOP®," and "ADOBE® REVEL®" are either registered trademarks or trademarks of Adobe Systems Incorporated in the United States and/or other countries.

Figure 10:
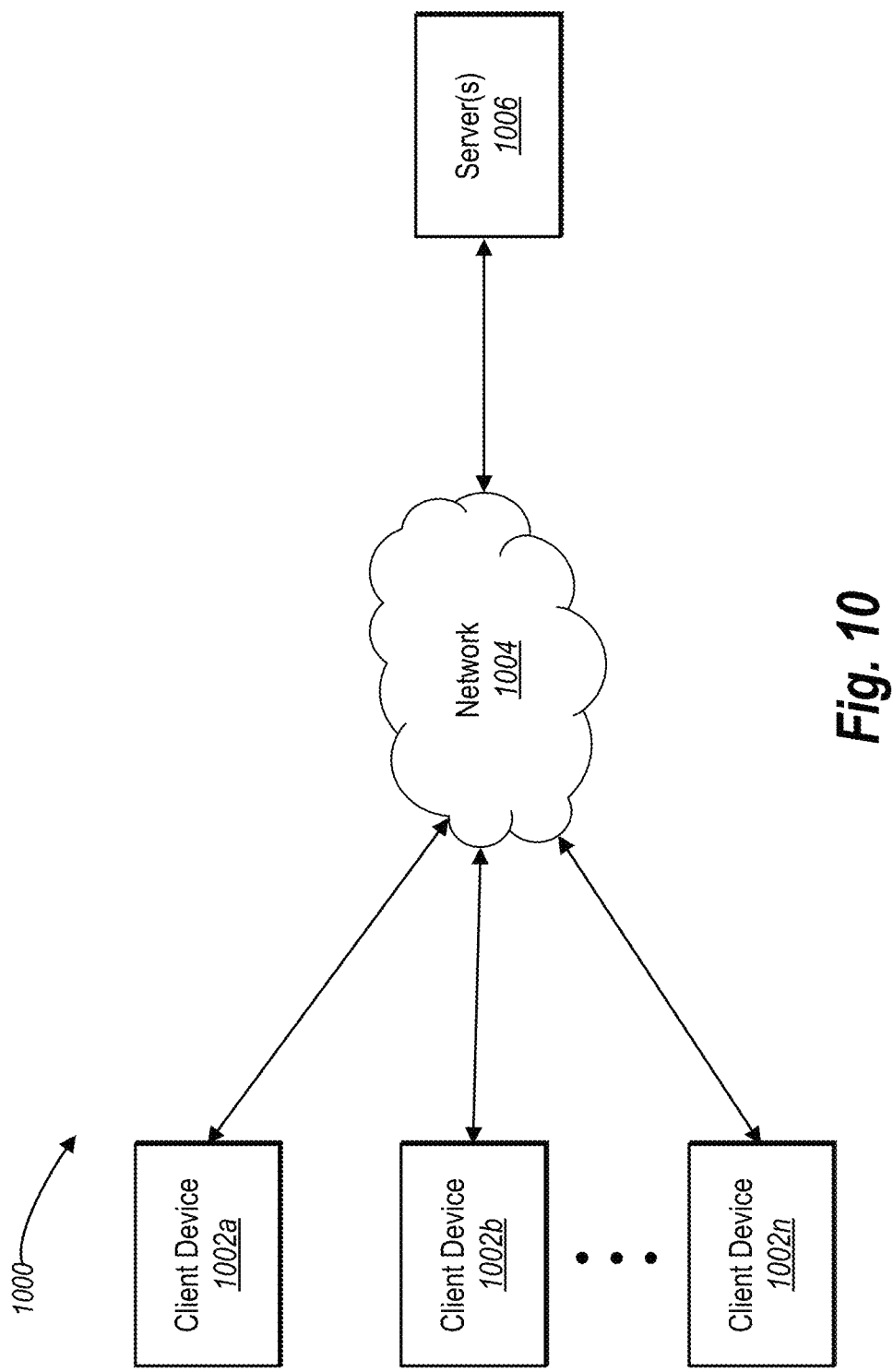
FIG. 10 illustrates a schematic diagram of an exemplary environment in which the digital segmentation system can operate in accordance with one or more embodiments.

For example, FIG. 10 illustrates a schematic diagram of one embodiment of an exemplary environment 1000 in which the digital segmentation system 900 can operate. In one or more embodiments, the environment 1000 includes a server 1006 connected to a plurality of client devices 1002a-1002n via a network 1004. The client devices 1002a-1002n, the network 1004, and the server 1006 may communicate with each other or other components using any communication platforms and technologies suitable for transporting data and/or communication signals, including any known communication technologies, devices, media, and protocols supportive of remote data communications, examples of which will be described in more detail below with respect to FIG. 13.

Although FIG. 10 illustrates a particular arrangement of the client devices 1002a-1002n, the network 1004, and the server 1006, various additional arrangements are possible. For example, the client devices 1002a-1002n may directly communicate with the server 1006, bypassing the network 1004. Or alternatively, the client devices 1002a-1002n may directly communicate with each other.

Similarly, although the environment 1000 of FIG. 10 is depicted as having various components, the environment 1000 may have additional or alternative components. For example, the environment 1000 can be implemented on a single computing device with the digital segmentation system 900. In particular, the digital segmentation system 900 may be implemented in whole or in part on the client device 1002a.

As illustrated in FIG. 10, the environment 1000 may include client devices 1002a-1002n. The client devices 1002*a*-1002*n* may comprise any computing device. For example, client devices 1002*a*-1002*n* may comprise one or more personal computers, laptop computers, mobile devices, mobile phones, tablets, special purpose computers, TVs, or other computing devices, including computing devices described below with regard to FIG. 13. Although three client devices are presented with regard to FIG. 10, it will be appreciated that client devices 1002*a*-1002*n* may comprise any number of client devices (greater or smaller than shown).

Moreover, as illustrated in FIG. 10, the client devices 1002*a*-1002*n* and the server 1006 may communicate via the network 1004. The network 1004 may represent a network or collection of networks (such as the Internet, a corporate intranet, a virtual private network (VPN), a local area network (LAN), a wireless local network (WLAN), a cellular network, a wide area network (WAN), a metropolitan area network (MAN), or a combination of two or more such networks. Thus, the network 1004 may be any suitable network over which the client devices 1002*a*-1002*n* may access the server 1006, or vice versa. The network 1004 will be discussed in more detail below with regard to FIG. 13.

In addition, the environment 1000 may also include the server 1006. The server 1006 may generate, store, receive, and transmit any type of data, including training images 916, digital image data 924, or other information. For example, the server 1006 may receive data from a client device, such as the client device 1002*a*, and send the data to another client device, such as the client device 1002*b* and/or 1002*n*. The server 1006 can also transmit electronic messages between one or more users of the environment 1000. In one example embodiment, the server 1006 is a data server. The server 1006 can also comprise a communication server or a web-hosting server. Additional details regarding the server 1006 will be discussed below with respect to FIG. 13.

As mentioned, in one or more embodiments, the server 1006 can include or implement at least a portion of the digital segmentation system 900. In particular, the digital segmentation system 900 can comprise an application running on the server 1006 or a portion of the digital segmentation system 900 can be downloaded from the server 1006. For example, the digital segmentation system 900 can include a web hosting application that allows the client devices 1002*a*-1002*n* to interact with content hosted at the server 1006. To illustrate, in one or more embodiments of the environment 1000, one or more client devices 1002*a*-1002*n* can access a webpage supported by the server 1006. In particular, the client device 1002*a* can run a web application (e.g., a web browser) to allow a user to access, view, and/or interact with a webpage or website hosted at the server 1006.

Upon the client device 1002*a* accessing a webpage hosted at the server 1006, in one or more embodiments, the server 1006 can provide access to one or more digital images (e.g., the digital image data 924, such as camera roll or an individual's personal photos) stored at the server 1006. Moreover, the client device 1002*a* can receive a request (i.e., via user input) to detect an object portrayed within a digital image, and provide the request to the server 1006. Upon receiving the request, the server 1006 can automatically perform the methods and processes described above to generate an optimized segmentation mask. The server 1006 can provide the segmentation mask (e.g., the set of pixels) to the client device 1002*a* for display to the user. Moreover, the user can interact with the client device 1002*a* indicating modifications to the object segmented from the image.

By way of an additional example, in one or more embodiments, the server 1006 generates a trained neural network (e.g., via the neural network training engine 916) and provides the trained neural network to the client device 1002*a*. In particular, the server 1006 embeds the trained neural network in a digital image editing application installed on the client device 1002*a* (i.e., ADOBE PHOTOSHOP). In one or more embodiments, the client device 1002*a* receives a request to segment an input image to identify an object portrayed in the input image (e.g., a digital image stored in digital image data 924 on the client device). The client device 1002*a* utilizes the embedded, trained neural network to select the target individual in the probe digital image (e.g., via the neural network application manager 906). Moreover, upon selecting the target individual, the client device 1002*a* can modify (e.g., move, copy, paste, or delete) the target object based on additional user input (e.g., utilizing the digital image manager 908).

As just described, the digital segmentation system 900 may be implemented in whole, or in part, by the individual elements 1002*a*-1006 of the environment 1000. It will be appreciated that although certain components of the digital segmentation system 900 are described in the previous examples with regard to particular elements of the environment 1000, various alternative implementations are possible. For instance, in one or more embodiments, the digital segmentation system 900 is implemented on the client device 1002*a*. Similarly, in one or more embodiments, the digital segmentation system 900 may be implemented on the server 1006. Moreover, different components and functions of the digital segmentation system 900 may be implemented separately among client devices 1002*a*-1002*n*, the server 1006, and the network 1004. For instance, in one or more embodiments the neural network training engine 916 is implemented as part of the server 1006; the digital image manager 910 is implemented as part of the client devices 1002*a*-1002*n* and the server 1006; and the storage manager 914 is implemented as part of the client devices 1002*a*-1002*n* and the server 1006. The environment 1000 can also be implemented in a variety of additional or alternative arrangements.

Moreover, the digital segmentation system 900 and/or server 1006 can actively collect information independently of a particular client device and independent of other components of the environment 1000. For example, the digital segmentation system 900 and/or server 1006 can actively collect information from interaction between users and the server 1006 (or other servers). Specifically, in one or more embodiments, the digital segmentation system 900 actively collects digital image data 924. For example, the digital segmentation system 900 can actively collect masks (or object boundaries) with regard to target individuals identified in probe digital images. Accordingly, the digital segmentation system 900 can actively collect masks, object boundaries, digital images, or other data utilized by the digital segmentation system 900. Moreover, the digital segmentation system 900 can utilize collected information (e.g., masks, digital images, or other data) to train a neural network (e.g., as part of training images 922).

Figure 11:
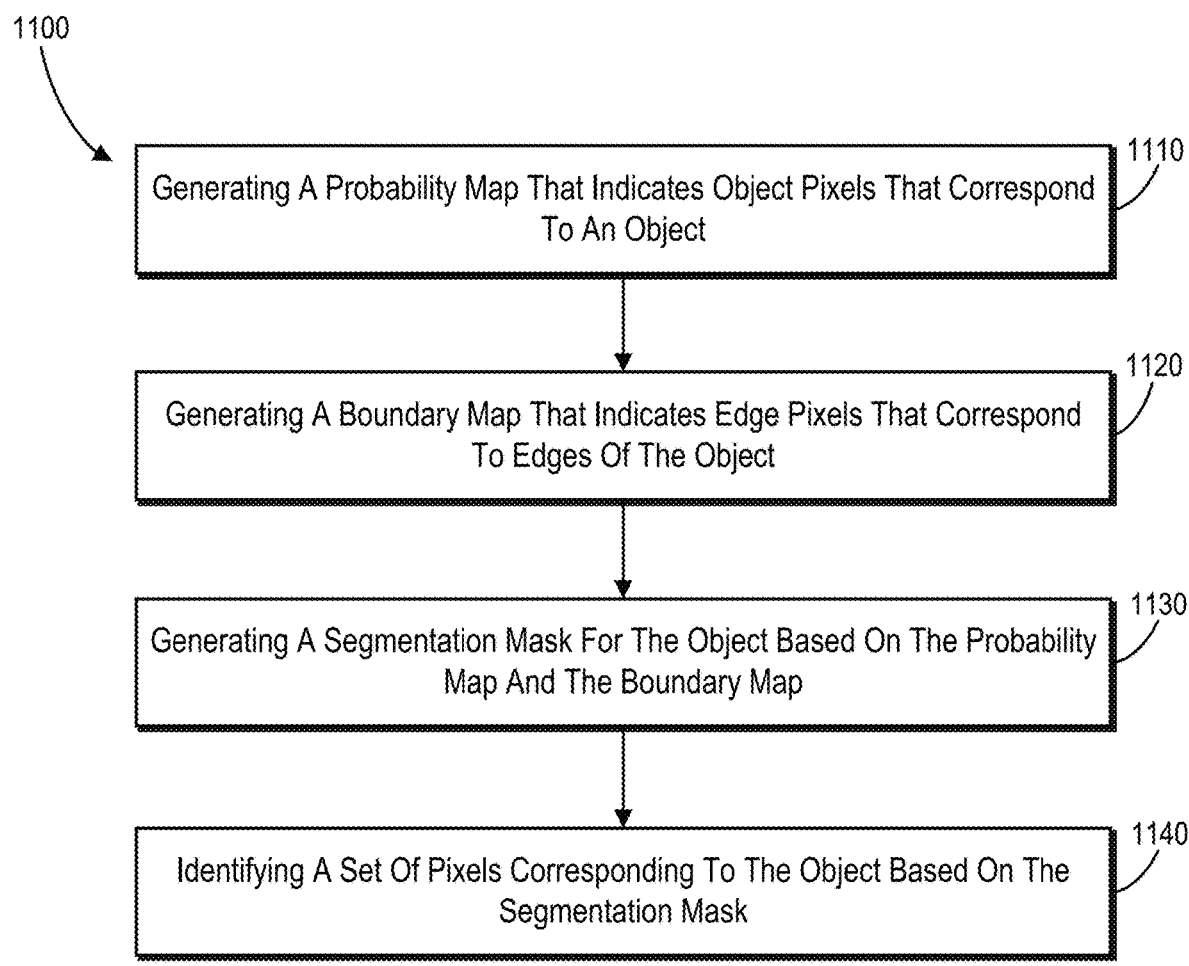
FIG. 11 illustrates a flowchart of a series of acts in a method of selecting an object within digital visual media in accordance with one or more embodiments.
Figure 12:
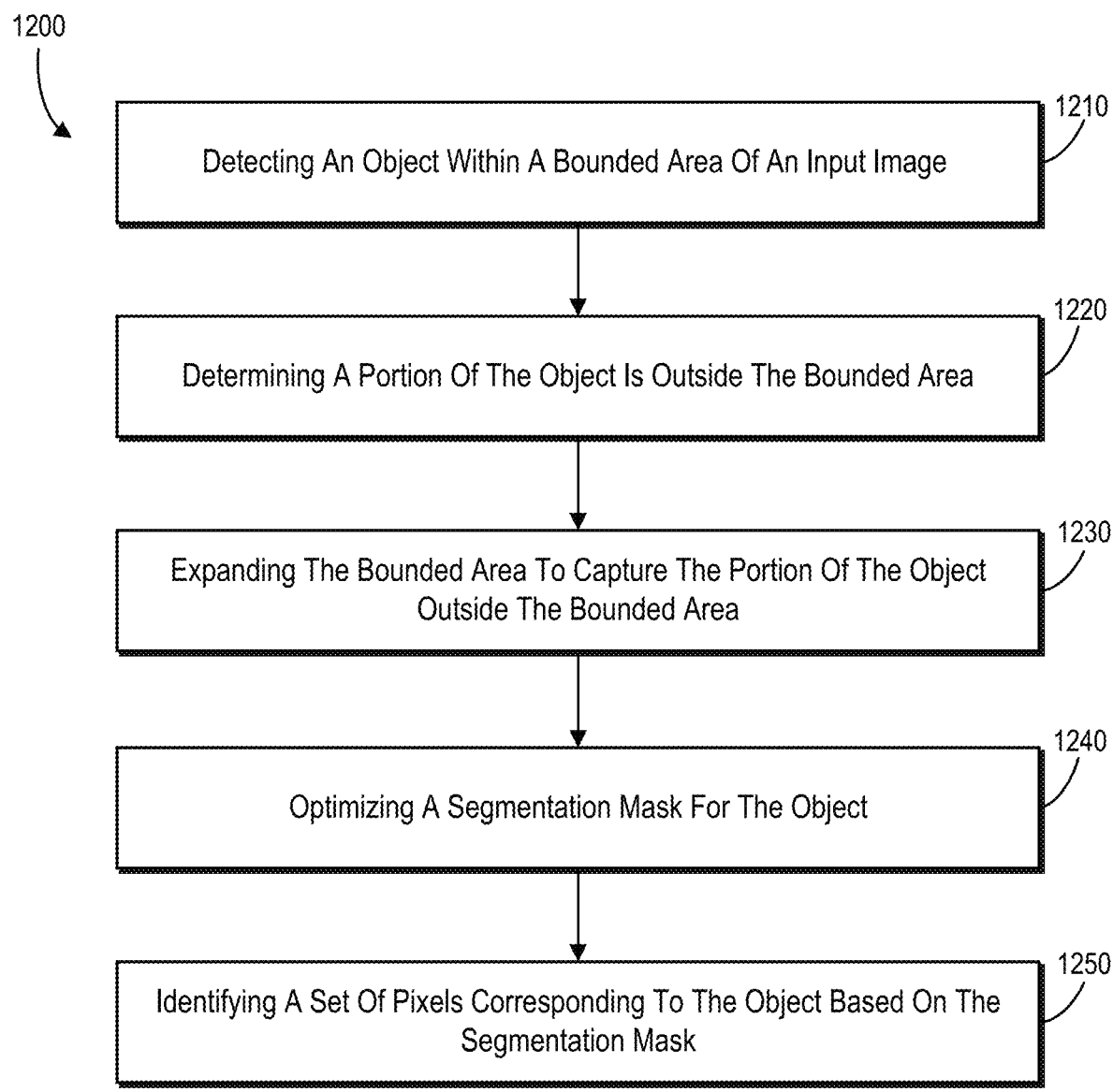
FIG. 12 illustrates another flowchart of a series of acts in a method of selecting an object within digital visual media in accordance with one or more embodiments.

FIGS. 1-10, the corresponding text, and the examples, provide a number of different systems and devices that allows a user to facilitate selection of target individuals within digital visual media. In addition to the foregoing, embodiments can also be described in terms of flowcharts comprising acts and steps in a method for accomplishing a particular result. For example, FIGS. 11-12 illustrates flowcharts of exemplary methods in accordance with one or more embodiments. The methods described in relation to FIGS. 11-12 may be performed with less or more steps/acts or the steps/acts may be performed in differing orders. Additionally, the steps/acts described herein may be repeated or performed in parallel with one another or in parallel with different instances of the same or similar steps/acts.

FIG. 11 illustrates a flowchart of a series of acts in a method 1100 of using deep learning to identify objects portrayed in the digital visual media in accordance with one or more embodiments. In one or more embodiments, the method 1100 is performed in a digital medium environment that includes the digital segmentation system 900. The method 1100 is intended to be illustrative of one or more methods in accordance with the present disclosure, and is not intended to limit potential embodiments. Alternative embodiments can include additional, fewer, or different steps than those articulated in FIG. 11.

As illustrated in FIG. 11, the method 1100 includes an act 1110 of generating a probability map that indicates object pixels that correspond to an object. In particular, the act 1110 can include generating, with a first neural network, a probability map for an input image, wherein the probability map indicates object pixels within the input image predicted to correspond to an object portrayed in the input image. For example, in one or more embodiments, act 1100 can include training the first neural network with a first plurality of digital training image pairs to train the first neural network to generate the probability map.

For instance, each digital training image pair within the first plurality of digital training image pairs can include a digital training image portraying an object and a ground mask that identifies the pixels within the digital training image that correspond to the object. Based on the digital training image pairs, act 1100 can include the first neural network using deep learning neural network techniques to learn to generate an accurate probability map for a given input image. In one or more embodiments the first neural network is a fine-tuned deconvolution neural network.

As shown in FIG. 11, the method 1100 also includes an act 1120 of generating a boundary map that indicates edge pixels that correspond to edges of the object. In particular, the act 1120 can include generating, with a second neural network, a boundary map for the input image, wherein the boundary map indicates edge pixels within the input digital image predicted to correspond to edges of the object portrayed in the input image. In one or more embodiments, act 1120 can further include training the second neural network with a second plurality of digital training image pairs. Moreover, each digital training image pair of the second plurality of digital training image pairs comprises a digital training image portraying an object and a boundary mask that identifies the pixels within the digital training image that correspond to edges of the object. As with the first neural network, the training of the second neural network comprises fine-tuning the second neural network to provide a fine-tuned deconvolution neural network.

In addition, as illustrated in FIG. 11, the method 1100 also includes an act 1130 of generating a segmentation mask for the object based on the probability map and the boundary map. In particular, the act 1130 can include, based on the probability map and the boundary map, generating, by at least one processor, a segmentation mask for the object by optimizing a fit between a mask boundary of the object and the edges of the object. For example, in one or more embodiments, the act 1130 includes optimizing the fit between the mask boundary of the object and the edges of the object with an iterative optimization process using a combination of color modeling and boundary modeling.

In addition, in one or more embodiments, act 1130 can include generating a boundary refinement map to determine boundary refinement pixels using the probability map and the boundary map. For example, the boundary refinement pixels comprise a set of pixels from the input image that are identified both as object pixels in the probability map and as edge pixels in the boundary map. Moreover, act 1130 can also include focusing an energy function to areas of the input image corresponding to the boundary refinement pixels, and wherein optimizing the fit between the mask boundary of the object and the edges of the object comprises iteratively solving the energy function to fit the mask boundary to the edges of the object. For example, in one or more embodiments, the energy function comprises a color modeling function using Gaussian mixture models.

Furthermore, as illustrated in FIG. 11, the method 1100 also includes an act 1140 of identifying a set of pixels corresponding to the object based on the segmentation mask. In particular, the act 1140 can include, identifying, by at least one processor, a set of pixels corresponding to the object portrayed in the input image based on the segmentation mask. For example, in one or more embodiments, the act 1140 can also include segmenting the object portrayed in the input image for editing purposes. For example, act 1140 can include copying the set of pixels, deleting the set of pixels, replacing the set of pixels, as well as other editing functionality.

Moreover, in one or more embodiments, the method 1100 further comprises the act of detecting the object portrayed in the input image. For example, the method 1100 can detect an area within the input image that includes the object. Moreover, the method 1100 can further comprise the act of determining a bounded area within the input image within which the object portrayed in the image is located. Based on the bounded area, the method 1100 further can comprise the act of creating a cropped portion of a portion of the input image corresponding to the bounded area. For example, in one or more embodiments, act 1100 comprises providing the cropped portion to the first neural network to use in generating the probability map, and providing the cropped portion to the second neural network to use in generating the boundary map.

As mentioned, FIG. 12 also illustrates a flowchart of a series of acts in a method 1200 of using deep learning to identify objects portrayed in the digital visual media in accordance with one or more embodiments. As shown in FIG. 12, the method 1200 includes an act 1210 of detecting an object within a bounded area of an input image. In particular, the act 1210 can include detecting, by at least one processor, an object portrayed within a bounded area of an input image. For example, in one or more embodiments, a fast-RCNN detects and generates the bounded area.

In addition, as shown in FIG. 12, the method 1200 also includes an act 1220 of determining a portion of the object is outside the bounded area. In particular, the act 1220 can include determining, by at least one processor, a portion of the object is located outside of the bounded area by detecting an indication within a refinement map corresponding to the bounded area, wherein the refinement map is based on fusing a probability map generated using a first neural network with a boundary map generated using a second neural network. For example, the act 1220 can include detecting that one or more boundary refinement pixels identified in the refinement map are positioned on an edge of the refinement map.

Furthermore, as illustrated in FIG. 12, the method 1200 also includes an act 1230 of expanding the bounded area to capture the portion of the object outside the bounded area. In particular, the act 1230 can include, based on determining the portion of the object is located outside of the bounded area, expanding the bounded area within the input image to include the portion of the object. For example, the act 1230 can include increasing the size of the bounded area in a direction associated with the edge of the refinement map on which the one or more boundary refinement pixels are positioned.

Additionally, as illustrated in FIG. 12, the method 1200 also includes an act 1240 of optimizing a segmentation mask for the object. In particular, the act 1240 can include, optimizing, by at least one processor, a segmentation mask for the object by optimizing a fit between a mask boundary of the object and edges of the object using a cropped portion of the input image corresponding to the expanded bounded area. For example, the act 1240 can include generating, using the cropped portion of the input image, an additional refinement map, wherein the additional refinement map is based on fusing an additional probability map generated using the first neural network with an additional boundary map generated using the second neural network.

Moreover, on one or more embodiments, act 1240 can further include generating an initial iteration of the segmentation mask using the additional refinement map and generating additional iterations of the segmentation mask, wherein each additional iteration of the segmentation mask adjusts the fit between the mask boundary and the edges of the object. Furthermore, act 1240 can include comparing a last iteration from the additional iterations of the segmentation mask with an iteration previous to the last iteration to determine a variance between the last iteration of the segmentation mask and the iteration of the segmentation mask previous to the last iteration, and based on the variance, determining the segmentation mask is optimized. For example, in some example embodiments, act 1240 includes comparing the variance to a predefined threshold variance; and determining the segmentation mask is optimized based on the variance being less than the predefined threshold variance.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 13:
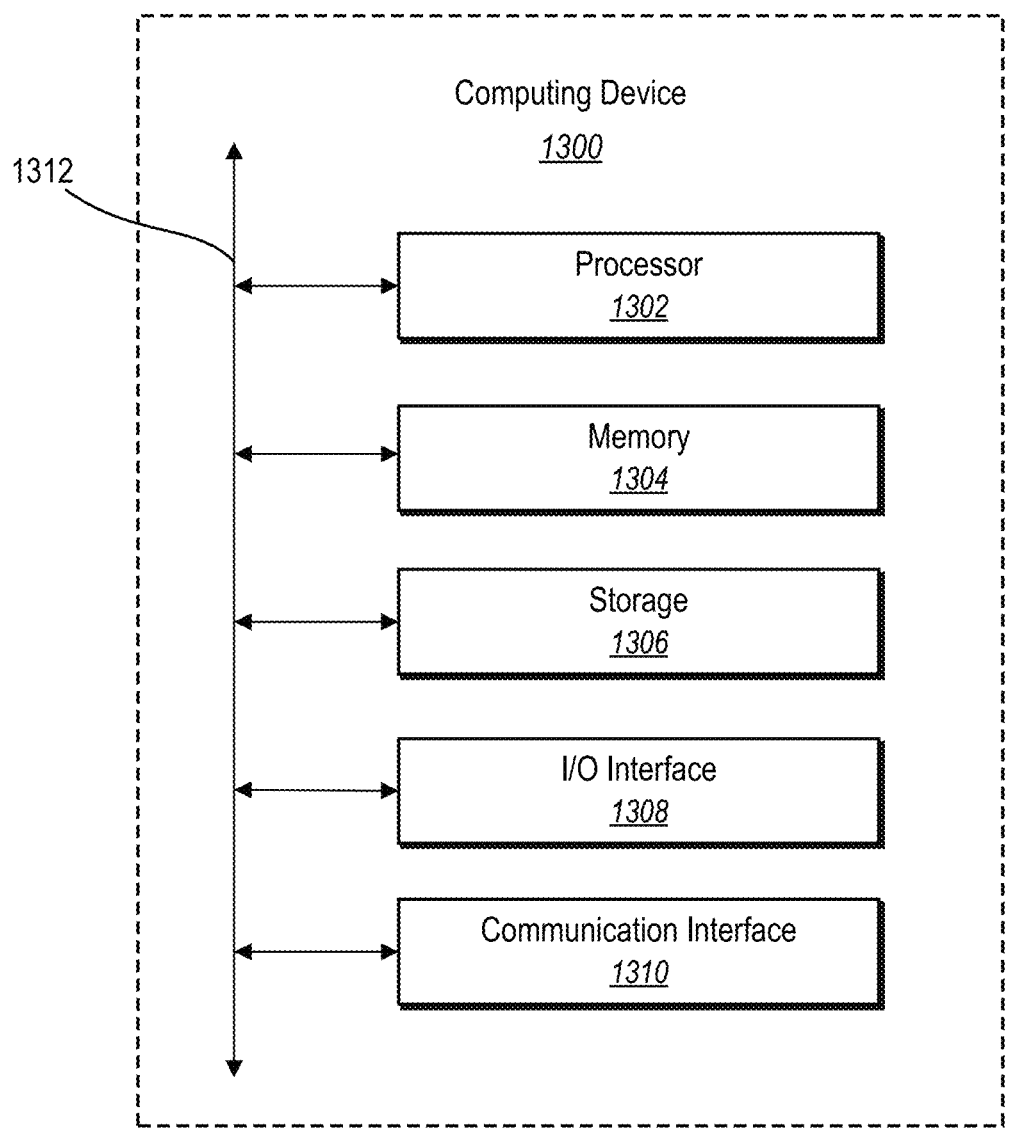
FIG. 13 illustrates a block diagram of an exemplary computing device in accordance with one or more embodiments.

FIG. 13 illustrates, in block diagram form, an exemplary computing device 1300 that may be configured to perform one or more of the processes described above. One will appreciate that one or more computing devices such as the computing device 1300 may implement the digital font classification system 600. As shown by FIG. 13, the computing device can comprise a processor 1302, memory 1304, a storage device 1306, an I/O interface 1308, and a communication interface 1310. In certain embodiments, the computing device 1300 can include fewer or more components than those shown in FIG. 13. Components of computing device 1300 shown in FIG. 13 will now be described in additional detail.

In particular embodiments, processor(s) 1302 includes hardware for executing instructions, such as those making up a computer program. As an example and not by way of limitation, to execute instructions, processor(s) 1302 may retrieve (or fetch) the instructions from an internal register, an internal cache, memory 1304, or a storage device 1306 and decode and execute them.

The computing device 1300 includes memory 1304, which is coupled to the processor(s) 1102. The memory 1304 may be used for storing data, metadata, and programs for execution by the processor(s). The memory 1304 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 1304 may be internal or distributed memory.

The computing device 1300 includes a storage device 1306 includes storage for storing data or instructions. As an example and not by way of limitation, storage device 1306 can comprise a non-transitory storage medium described above. The storage device 1306 may include a hard disk drive (HDD), flash memory, a Universal Serial Bus (USB) drive or a combination these or other storage devices.

The computing device 1300 also includes one or more input or output ("I/O") devices/interfaces 1308, which are provided to allow a user to provide input to (such as user strokes), receive output from, and otherwise transfer data to and from the computing device 1300. These I/O devices/interfaces 1308 may include a mouse, keypad or a keyboard, a touch screen, camera, optical scanner, network interface, modem, other known I/O devices or a combination of such I/O devices/interfaces 1308. The touch screen may be activated with a stylus or a finger.

The I/O devices/interfaces 1308 may include one or more devices for presenting output to a user, including, but not limited to, a graphics engine, a display (e.g., a display screen), one or more output drivers (e.g., display drivers), one or more audio speakers, and one or more audio drivers. In certain embodiments, devices/interfaces 1308 is configured to provide graphical data to a display for presentation to a user. The graphical data may be representative of one or more graphical user interfaces and/or any other graphical content as may serve a particular implementation.

The computing device 1300 can further include a communication interface 1310. The communication interface 1310 can include hardware, software, or both. The communication interface 1310 can provide one or more interfaces for communication (such as, for example, packet-based communication) between the computing device and one or more other computing devices 1300 or one or more networks. As an example and not by way of limitation, communication interface 1310 may include a network interface controller (NIC) or network adapter for communicating with an Ethernet or other wire-based network or a wireless NIC (WNIC) or wireless adapter for communicating with a wireless network, such as a WI-FI. The computing device 1300 can further include a bus 1312. The bus 1312 can comprise hardware, software, or both that couples components of computing device 1300 to each other.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

We claim:

1. In a digital medium environment for editing digital visual media, a computer-implemented method of using deep learning to segment objects from the digital visual media, the computer-implemented method comprising:

generating a probability map for an input image, wherein the probability map indicates object pixels predicted to correspond to an object;

generating a boundary map for the input image, wherein the boundary map indicates edge pixels predicted to correspond to edges of the object;

combining the probability map and the boundary map; and generating a segmentation mask that indicates a boundary of the object by iteratively adjusting a mask boundary of the object based on the combination of the boundary map and the probability map.

2. The method of claim 1, further comprising identifying a cropped portion of the input image comprising the object utilizing an object detection algorithm.

3. The method of claim 2, wherein:

generating the probability map comprises utilizing a first de-convolutional neural network to process the cropped portion of the input image to identify the edge pixels within the cropped portion of the input image; and generating the boundary map comprises utilizing a second de-convolutional neural network to process the cropped portion of the input image to identify boundary pixels within the cropped portion of the input image.

4. The method of claim 3, further comprising:

analyzing the segmentation mask to determine that a portion of the object is located outside of the cropped portion of the input image;

based on determining that the portion of the object is located outside the cropped portion of the input image, generating an updated cropped portion of the input image by expanding the cropped portion to include additional content from the input image predicted to include the portion of the object located outside of the cropped portion of the input image; and refine the segmentation mask based on the updated cropped portion of the input image.

5. The method of claim 4, wherein refining the segmentation mask comprises:

utilizing the first de-convolutional neural network to generate an updated probability map for the updated cropped portion of the input image;

utilizing the second de-convolutional neural network to generate an updated boundary map for the updated cropped portion of the input image; and refining the segmentation mask based on the updated probability map and the updated boundary map.

6. The method of claim 3, further comprising training the first de-convolutional neural network using a plurality of image mask pairs, the plurality of image mask pairs comprising a first plurality of images portraying objects and corresponding object masks known to accurately correspond to pixels representing the objects portrayed in the first plurality of images.

7. The method of claim 6, further comprising training the second de-convolutional neural network using a plurality of image boundary pairs, the plurality of image boundary pairs comprising a second plurality of images portraying objects and corresponding object boundaries known to accurately correspond to edges of the objects portrayed in the second plurality of images.

8. The method of claim 1, wherein generating the segmentation mask comprises analyzing pixels of the input image identified by the probability map and the boundary map to minimize an energy function until the segmentation mask is gradually fit to edges of the object portrayed in the input image.

9. The method of claim 8, wherein minimizing the energy function comprises iteratively refining a combination of color modeling and boundary modeling of the pixels identified by the combination of the probability map and the boundary map.

10. The method of claim 1, wherein combining the probability map and the boundary map comprises generating a refinement map indicating pixels that are both edge pixels and object pixels.

11. A system comprising:

a memory comprising:

a convolutional neural network trained to generate feature maps of digital images;

a first de-convolutional neural network trained to generate probability maps indicating pixels of objects portrayed within digital images;

a second de-convolutional neural network trained to generate boundary maps indicating pixels of boundaries of objects portrayed within digital images;

at least one processor; and a non-transitory computer readable medium storing instructions thereon that, when executed by the at least one processor, cause the system to:

generate, using the convolutional neural network, a feature map for an input image, the input image comprising an object portrayed therein;

generate, based on the feature map and utilizing the first de-convolutional neural network, a probability map for the input image;

generate, based on the feature map and utilizing the second de-convolutional neural network to a boundary map for the input image; and generate, based on the probability map and the boundary map, a segmentation mask comprising an identification of boundary pixels within the input image corresponding to the object.

12. The system of claim 11, wherein the instructions, when executed by the at least one processor, cause the system to generate the feature map by identifying one or more edges, corners, or regions of interest of the input image.

13. The system of claim 11, further comprising instructions that, when executed by the at least one processor, cause the system to:

identify a cropped portion of the input image comprising the object portrayed therein;

wherein the instructions, when executed by the at least one processor, cause the system to generate the probability map by applying the first de-convolutional neural network to the cropped portion of the input image to identify edge pixels within the cropped portion of the input image; and wherein the instructions, when executed by the at least one processor, cause the system to generate the boundary map by applying the second de-convolutional neural network to the cropped portion of the input image to identify the boundary pixels within the cropped portion of the input image.

14. The system of claim 11, further comprising instructions that, when executed by the at least one processor, cause the system to:

train the first de-convolutional neural network using a plurality of image mask pairs, the plurality of image mask pairs comprising a first plurality of images portraying objects and corresponding object masks known to accurately correspond to pixels representing the objects portrayed in the first plurality of images; and train the second de-convolutional neural network using a plurality of image boundary pairs, the plurality of image boundary pairs comprising a second plurality of images portraying objects and corresponding object boundaries known to accurately correspond to edges of the objects portrayed in the second plurality of images.

15. The system of claim 11, wherein the instructions, when executed by the at least one processor, cause the system to generate the segmentation mask by analyzing pixels of the input image identified by the probability map and the boundary map to minimize an energy function until the segmentation mask is gradually fit to edges of the object portrayed in the input image.

16. The system of claim 15, wherein the instructions, when executed by the at least one processor, cause the system to minimize the energy function by iteratively refining a combination of color modeling and boundary modeling of the pixels identified by the probability map and the boundary map.

17. A non-transitory computer readable medium storing instructions thereon that, when executed by at least one processor, cause a computer system to:
generate, using a convolutional neural network, a feature map for an input image, the input image comprising an object portrayed within the input image;
utilize a first de-convolutional neural network to generate, based on the feature map, a probability map for the input image, wherein the probability map indicates object pixels predicted to correspond to the object;
utilize a second de-convolutional neural network to generate, based on the feature map, a boundary map for the input image, wherein the boundary map indicates edge pixels predicted to correspond to edges of the object; and
generate, based on the probability map and the boundary map, a segmentation mask comprising an identification of boundary pixels within the input image corresponding to the object.

18. The computer readable medium of claim 17, further comprising instructions that, when executed by the at least one processor, cause the computer system to:
identify, based on the feature map, a cropped portion of the input image comprising the object portrayed therein;
wherein utilizing the first de-convolutional neural network to generate the probability map comprises applying the first de-convolutional neural network to the cropped portion of the input image to identify the edge pixels within the cropped portion of the input image; and
wherein utilizing the second de-convolutional neural network to generate the boundary map comprises applying the second de-convolutional neural network to the cropped portion of the input image to identify the boundary pixels within the cropped portion of the input image.

19. The computer readable medium of claim 17, further comprising instructions that, when executed by the at least one processor, cause the computer system to:
train the first de-convolutional neural network using a plurality of image mask pairs, the plurality of image mask pairs comprising a first plurality of images portraying objects and corresponding object masks known to accurately correspond to pixels representing the objects portrayed in the first plurality of images; and
train the second de-convolutional neural network using a plurality of image boundary pairs, the plurality of image boundary pairs comprising a second plurality of images portraying objects and corresponding object boundaries known to accurately correspond to edges of the objects portrayed in the second plurality of images.

20. The computer readable medium of claim 17, wherein generating the segmentation mask comprises analyzing pixels of the input image identified by the probability map and the boundary map to minimize an energy function until the segmentation mask is gradually fit to edges of the object portrayed in the input image, wherein minimizing the energy function comprises iteratively refining a combination of color modeling and boundary modeling of the pixels identified by the probability map and the boundary map.

* * * * *